(12) United States Patent
Mishra et al.

(10) Patent No.: US 7,669,029 B1
(45) Date of Patent: Feb. 23, 2010

(54) LOAD BALANCING A DATA STORAGE SYSTEM

(75) Inventors: Kesari Mishra, Sunnyvale, CA (US); Swaminathan Ramany, Sunnyvale, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 466 days.

(21) Appl. No.: 11/600,526

(22) Filed: Nov. 15, 2006

(51) Int. Cl.
*G06F 13/00* (2006.01)

(52) U.S. Cl. .................. 711/170; 711/171; 711/172; 711/112

(58) Field of Classification Search ......... 711/111–112, 711/170–172
See application file for complete search history.

(56) References Cited

U.S. PATENT DOCUMENTS

2005/0172073 A1* 8/2005 Voigt et al. .................. 711/114

OTHER PUBLICATIONS

"Bin Packing"; American Mathematical Society, © 2006, 5 pages.

* cited by examiner

*Primary Examiner*—Jasmine Song
(74) *Attorney, Agent, or Firm*—Blakely, Sokoloff, Taylor & Zafman LLP

(57) ABSTRACT

An apparatus and method for automatically load balancing one or more workload groups to a set of available physical resources of a data storage system, and generating a layout planning recommendation of the set of available physical resources that supports the one or more workload groups based on the load balancing.

34 Claims, 14 Drawing Sheets

Layout Planning Recommendation #1 1000
NetApp Exchange Storage Server -- Version
X.X.X

1010 → Summary Info :

Platform Name : Storage Server Cluster Type A
Number of Clusters : # of Clusters
Drive Type : 'X' GB and 'Y' RPM
RAID Type : RAID double parity
RAID Group Size : # in group

Layout Suggestions — 1001

Layout on Cluster 1 — 1002

1003 → Detailed Layout on Cluster 1 – Storage Server A

Headroom on the system : 91%

Total Number of disks needed for this storage server : 18

Total Number of shelves needed for this storage server : 2

| User Specified Aggregate # 1005 | Aggregate Consists of 1006 | Total Disks for aggregate (Data disks + Parity disks) 1007 | Disks determined by 1008 |
|---|---|---|---|
| 2 | Log Space for Storage Group 1 in Server 1<br><br>Log Space for Storage Group 2 in Server 1 | 2 + 2<br>See Warning 1 | Processing Requirement |
| 1 | Databases for Storage Group 1 in Server 1<br><br>Databases for Storage Group 2 in Server 1 | 12 + 2<br>See Warning 1 | Capacity Requirement |

1004 → Detailed Layout on Cluster 1 - Head B

Headroom on the system : 91%

Total Number of disks needed for this head : 18

Total Number of shelves needed for this head : 2

| User Specified Aggregate # 1005 | Aggregate Consists of 1006 | Total Disks for aggregate (Data disks + Parity disks) 1007 | Disks determined by 1008 |
|---|---|---|---|
| 4 | Log Space for Storage Group 3 in Server 1<br><br>Log Space for Storage Group 4 in Server 1 | 2 + 2<br>See Warning 1 | Processing Requirement |
| 3 | Databases for Storage Group 3 in Server 1<br><br>Databases for Storage Group 4 in Server 1 | 12 + 2<br>See Warning 1 | Capacity Requirement |

Comments and Warnings : "Warning 1." — 1009

FIG. 10

LOAD BALANCING A DATA STORAGE SYSTEM

TECHNICAL FIELD

This invention relates to the field of data storage systems and, in particular, to layout planning of data storage systems.

BACKGROUND

A data storage system allows one or more client devices ("clients") to access (i.e., read and/or write) data on the data storage system through a host device ("host"), such as a storage server, which is physically separate from the client. The clients typically communicate with the host over a network, such as a local area network, wide area network, virtual private network, or point-to-point connection. The host typically is connected to one or more storage devices directly or over a network, such as a storage area network (SAN). A storage device can be, for example, a disk, a tape, a solid-state memory storage device, or an array of disks or tapes. Some data storage systems include two or more hosts. Multiple hosts can be clustered such that two or more hosts are connected to each storage device for increased fault tolerance.

As shown in FIG. 1, an illustrative environment 100 includes clients 110(a)-110(c) that are connected to hosts 130(a)-130(b) through a network 120. The clients 110(a)-110(c) communicate requests for services to the hosts 130(a)-130(b) over the network 120 and receive results back from the hosts 130(a)-130(b) over the network 120. The clients 110(a)-110(c) typically are computers such as general-purpose computers or application servers. The number of clients can range from one to an arbitrarily large number. The hosts 130(a)-130(b) are capable of accessing data stored on storage devices 150(a)-150(b), which can be, for example, one or more Redundant Arrays of Independent (or Inexpensive) Disks (RAID). The hosts 130(a)-130(b) may also be capable of storing and managing shared files in a set of storage devices 150(a)-150(b) on behalf of one or more clients 110(a)-110(c). Examples of hosts 130(a)-130(b) are network storage servers that are available from Network Appliance, Inc., of Sunnyvale, Calif. The hosts 130(a)-130(b) are connected to the storage devices 150(a)-150(b). Any suitable connection technology can be used, e.g., Fibre Channel, SCSI, etc.

One configuration in which file servers can be used is a network attached storage (NAS) configuration. In a NAS configuration, a file server can be implemented in the form of an appliance that attaches to a network, such as a local area network (LAN) or a corporate intranet. An example of such an appliance is any of the Filer products made by Network Appliance, Inc. in Sunnyvale, Calif.

Another specialized type of network is a storage area network (SAN). A SAN is a highly efficient network of interconnected, shared storage devices. Such devices are also made by Network Appliance, Inc. One difference between NAS and SAN is that in a SAN, the storage appliance provides a remote host (e.g., storage server) with block-level access to stored data, whereas in a NAS configuration, the file server normally provides clients with file-level access to stored data.

The number of hosts can range from one to an arbitrarily large number, and the number of storage arrays likewise can range from one to an arbitrarily large number. The hosts 130(a)-130(b) typically are storage servers that can be clustered for increased fault-tolerance. The storage arrays 150(a)-150(b) typically are arrays of magnetic disks, such as Fibre Channel or SCSI disks, contained in one or more shelves. The combination of the hosts 130(a)-130(b) and the storage arrays 150(a)-150(b) forms a data storage system. The data storage system can use a RAID design and RAID protocols for the storage arrays 150(a)-150(b), which helps protect against data loss in the event of a disk failure. In a RAID-4 system, for example, data is striped across multiple disks and is protected by parity information. If a disk in the array of disks fails, the parity information is used to recover the lost data from the failed disk.

A system architect or administrator has many choices to make when designing, expanding, or reconfiguring a data storage system such as that show in FIG. 1. The system architect or administrator may make changes in designing the data storage system when deploying new resources for the data storage system, moving to a new vendor of resources, or the like. The architect may expand the data storage system when there is a growth in number of employees or customers, and consequently the number of resources needed, an increase in the storage requirements due to new applications for the data storage system, or the like. Similarly, the system architect or administrator may reconfigure the data storage system for similar reasons described above with designing and expanding. Such an architect or administrator will generally use an application program such as a sizing tool or a capacity planning tool for this purpose.

Software sizing tools are computer program applications that help a system architect or administrator decide how much data storage a given computer system requires based on such variables as the number of users the computer system has and how that storage should be structured (e.g., how many hosts and what type of reliability options should be used). Software sizing tools may also help a system architect or administrator decide which physical resources are needed for performance requirements, for example, performance requirements in terms of throughput (e.g., MegaBytes read or written per second), response times of the resources, or the like. In addition, the sizing tool help the system architect or administrator decide how many storage servers, what type of storage servers, how many storage devices, what types of storage devices, and the like. Software capacity planning tools, which can be part of or separate from sizing tools, are computer program applications that allow the system architect to analyze the performance of various configurations of data storage equipment. A conventional software sizing or capacity planning tool typically must be replaced by a newer version of the tool when new hardware (e.g., a new type of disk array) becomes available. When multiple sizing or capacity planning tools are used in conjunction (e.g., a tool for sizing a storage system for a database application program and a tool for sizing the storage system for an e-mail application program), inconsistent results can occur, especially when the tools use different underlying models that calculate suggested configurations based on the inputs. Using multiple sizing or capacity planning tools also is cumbersome because each tool typically has a different input format for the system requirements and recommendations are output in different formats as well.

Even though conventional sizing tools help system architects or administrators decide how much data storage a given computer system requires based on the variables described above, conventional software sizing tools do not help system architects or administrators decide how to layout the data storage system. For example, current sizing tools determine the amount and type of physical resources (e.g., the number and/or type of storage servers and storage devices) that would support the provided workload groups, but they do not provide any recommendation or guidance on how to layout the workload groups on those physical resources and where to place the workload groups to ensure an even utilization of resources for a balanced deployment. A workload group is a set of one or more variables to be used by the sizing infrastructure module and layout planning recommendation module in determining the layout configuration of the data storage system. The workload groups may be input by the user, or alternatively, be input from the calling application program. The workload groups may include, for example, as described herein, a capacity requirement, a performance requirement, a reliability requirement, general configuration requirements, and/or one or more workload entities, such as logs, databases, volumes, files, aggregates, or the like. The one or more workload entities may also be, for example, the number of users the data storage system has, how that storage should be structured (e.g., how many hosts and what type of reliability options should be used), a respective associated required throughput that is included in the performance requirement of the workload group, or the like.

SUMMARY OF INVENTION

Described herein is an apparatus and method that automatically load balances one or more workload groups to a set of available physical resources of a data storage system, and generates a layout planning recommendation of the set of available physical resources. The apparatus and method generate the layout planning recommendation based on the load balancing.

BRIEF DESCRIPTION OF THE DRAWINGS

The present invention is illustrated by way of example, and not by way of limitation, in the figures of the accompanying drawings.

FIG. 10 illustrates an embodiment of one layout planning recommendation of a set of available physical resources.

DETAILED DESCRIPTION

Figure 1:
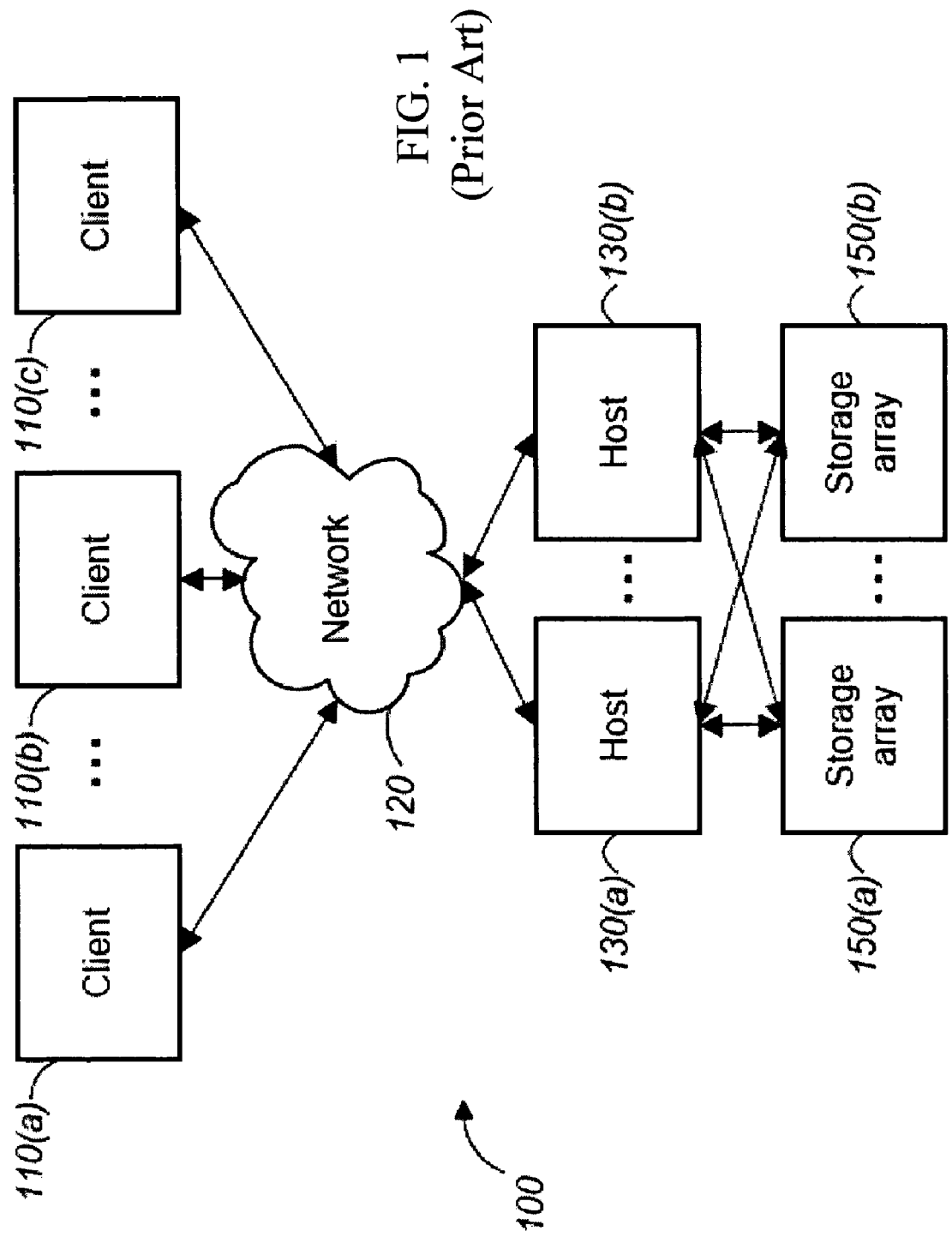
FIG. 1 is a block diagram of a computing environment.

Described herein are apparatuses and methods for automatically load balancing one or more workload groups to a set of available physical resources of a data storage system, and generating a layout planning recommendation of the set of available physical resources that supports the one or more workload groups based on the load balancing. The embodiments describe herein provide recommendations and/or guidance on how to layout the workload groups on the available physical resources, and/or where to place the workload groups in an effort to ensure a more even utilization of the available physical resources for a balanced deployment, as compared to the conventional sizing tools. Accordingly, the embodiments described herein help users, such as storage architects or administrators, to design a data storage system with a balanced deployment, unlike the conventional sizing tools described above. By load balancing the workload groups to generate the layout planning recommendation using bin packing algorithms and heuristics, the embodiments described herein map the workload groups to the available physical resources in a more optimal way than was possible with conventional sizing tools.

The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid obscuring the present invention. Thus, the specific details set forth are merely exemplary. Particular implementations may vary from these exemplary details and still be contemplated to be within the spirit and scope of the present invention.

The embodiments described herein include an apparatus and method for effectively mapping workload groups which have their own storage resource requirements (e.g., performance requirements and capacity requirements) to a set of physical resources (e.g., one or more storage servers (e.g., hosts) and their associated storage devices (e.g., storage arrays) in such a way that the available physical resources are utilized evenly (also known as load balanced). Embodiments of the method may be done heuristically, as opposed to an algorithmic approach. A heuristic approach is a method of problem solving to achieve a best case solution when a formal proof of the optimization may not be possible or is impractical. It should be noted that the embodiments described herein may not produce a definite optimization, but rather a best case optimization. The heuristic approach to load balancing a set of available physical resources may include using a problem-solving technique (e.g., performing bin packing algorithms) in which the most appropriate solution of several solutions found by alternative methods is selected. Although some of the embodiments are described with respect to bin packing algorithms, it should be noted that other packing algorithms may be used. For example, the load balancing of the workload groups to generate the layout planning recommendation may be done using other packing algorithms, for example, a combinatorial solution, such as used in the knapsack problem. The knapsack problem is a problem in combinatorial optimization that chooses multiple objects of different volumes to fit into one container that can hold a fixed volume. Using the combinatorial solution may eliminate the use of heuristics. For example, instead of using heuristics, a decision tree may be used to develop the combinatorial solution for the packing problem. Algorithms regarding the knapsack problem are known in the art, and accordingly, detailed descriptions regarding them have not been included herein. Alternatively, other packing algorithms may be used that are known by those of ordinary skill in the art, such as set packing, subset sum, or the like.

The embodiments may be incorporated into a sizing infrastructure module, and may enable the sizing infrastructure module to generate and output layout recommendations in terms of mapping aggregates and flexible volumes to appropriate storage servers in various sizing tools or capacity planning tools built over sizing infrastructure module. An aggregate is a logical aggregation of physical storage; i.e., a logical container for a pool of storage, combining one or more physical mass storage devices (e.g., disks) or parts thereof into a single logical storage object, which contains or provides storage for one or more other logical data sets at a higher level of abstraction (e.g., volumes). A volume is a logical data set which is an abstraction of physical storage, combining one or more physical mass storage devices (e.g., disks) or parts thereof into a single logical storage object, and which is managed as a single administrative unit, such as a single file system. A volume may be defined from a larger group of available storage, such as an aggregate. A flexible volume which is flexibly associated with the underlying physical storage (e.g., aggregate).

Figure 2A:
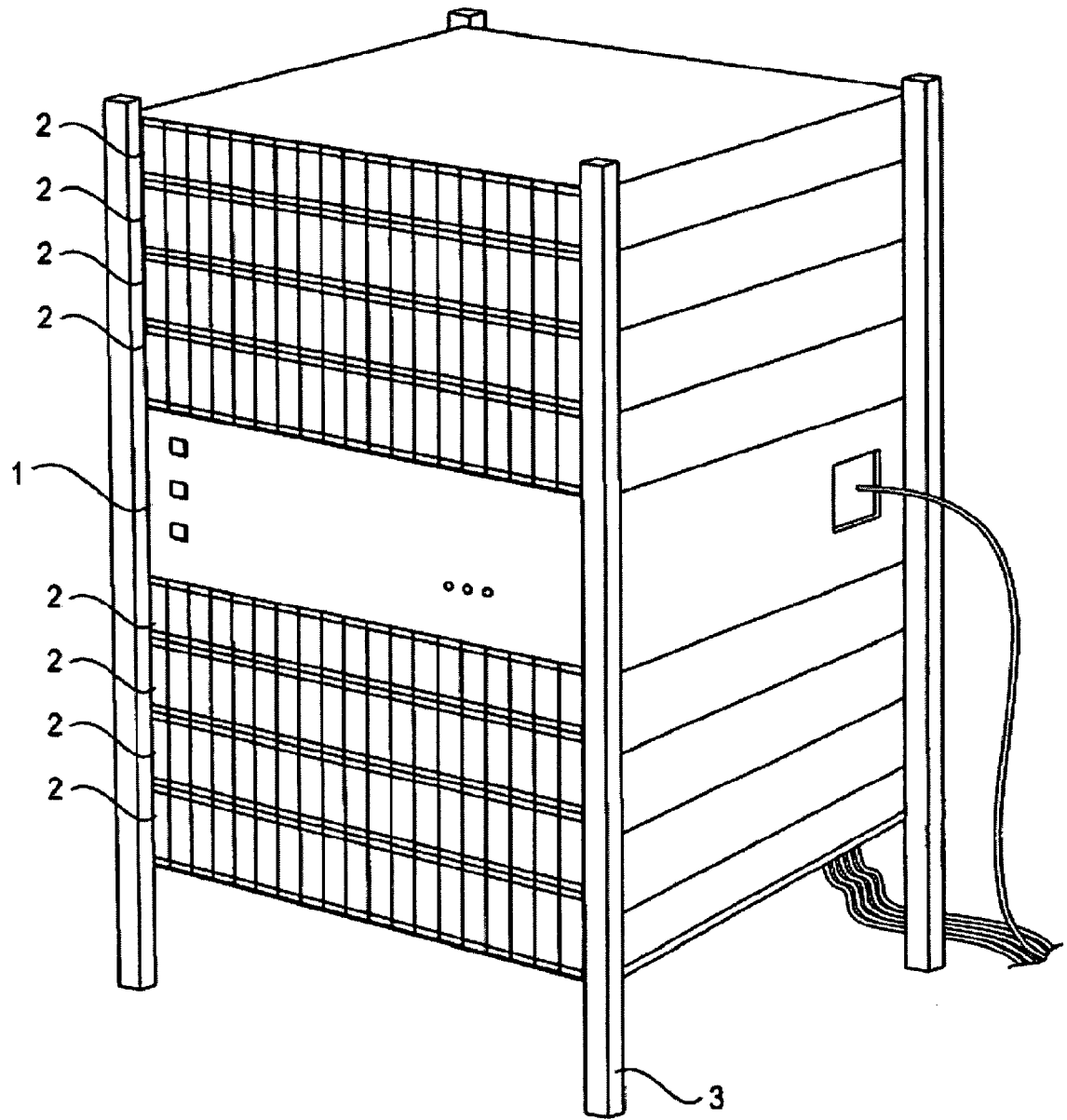
FIG. 2A is a portion of a "rack and stack" (modular) storage server system.

In a modular file server system, the system can be built up by adding multiple chassis in some form of rack and then cabling the chassis together. The disk drive enclosures are often called "shelves" and, more specifically, "just a bunch of disks"(JBOD) shelves. The term JBOD indicates that the enclosure essentially contains only physical storage devices and little or no electronic "intelligence." Some disk drive enclosures include one or more RAID controllers, but such enclosures are not normally referred to as "JBOD" due to their greater functional capabilities. A modular file server system is illustrated in FIG. 2A and is sometimes called a "rack and stack" system. In FIG. 2A, a file server storage server 1 is connected by external cables to multiple disk shelves 2 mounted in a rack 3. The file server storage server 1 enables access to stored data by one or more remote client computers (not shown) that are connected to the storage server 1 by external cables.

Figure 2B:
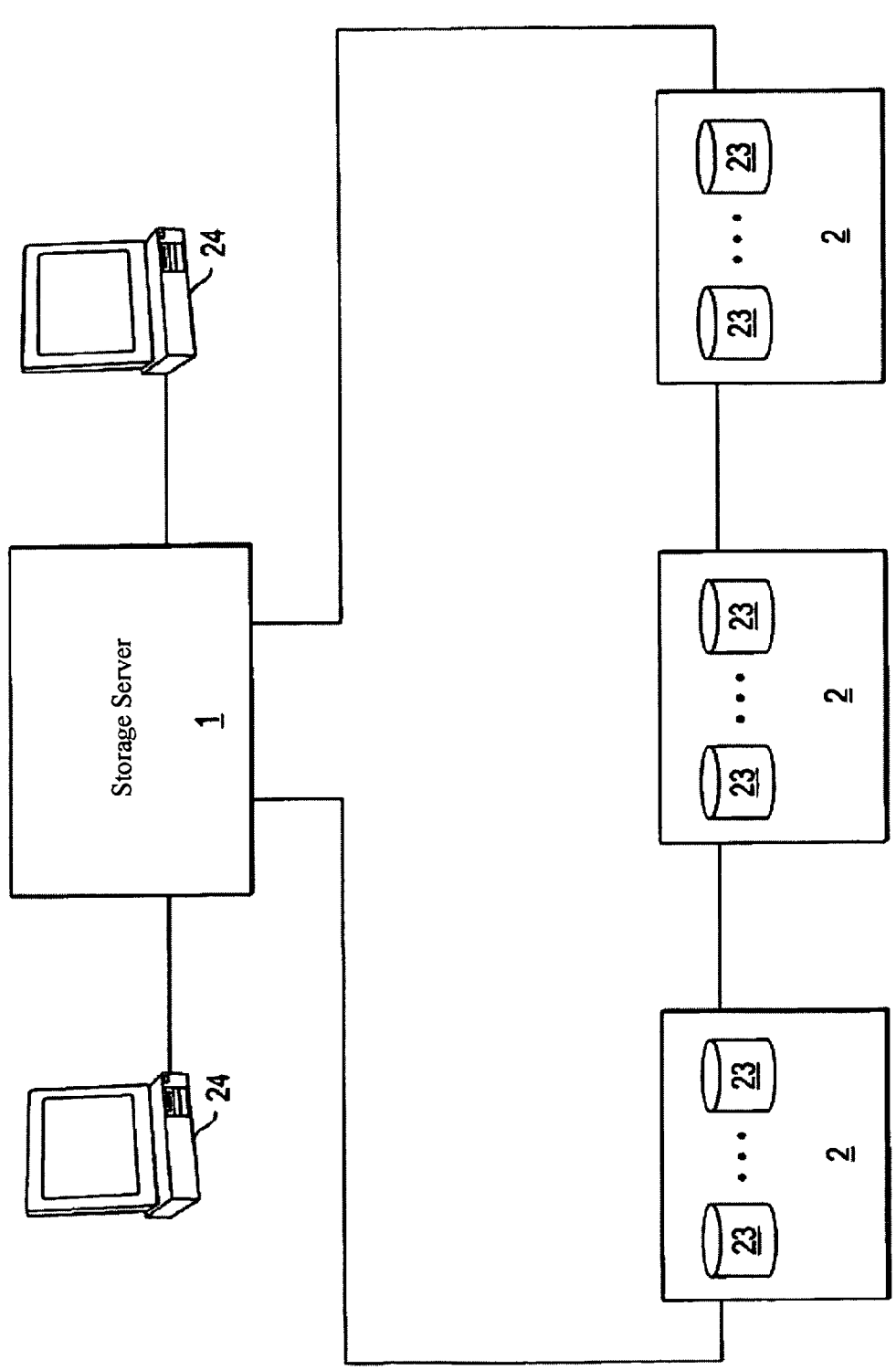
FIG. 2B is a block diagram of one embodiment of a modular storage server system.

FIG. 2B illustrates a block diagram of a modular type file server system such as mentioned above. A modular file server storage server 1 is contained within its own enclosure and is connected to a number of the external disk drive shelves 2 in a loop configuration. Each shelf 2 contains multiple disk drives 23 operated under control of the storage server 1 according to RAID protocols. The file server storage server 1 provides a number of clients 24 with access to shared files stored in the disk drives 23. Note that FIG. 2B shows a simple network configuration characterized by a single loop with three shelves 2 in it; however, other network configurations are possible. For example, there can be a greater or smaller number of shelves 2 in the loop; there can be more than one loop attached to the storage server 1; or, there can even be one loop for every shelf 2.

In designing the configuration of the data storage system, such as the data storage system of FIGS. 2A and 2B, a user, such as a storage architect or storage administrator may using a system that includes a calling application program and a sizing infrastructure module. The sizing infrastructure modules of the embodiments described herein implement host behavior models for use by the sizing tools or capacity planning tools. For example, a sizing or capacity planning application program (e.g., calling application program) may send the sizing infrastructure module requirement information (e.g., required throughput and capacity), and the sizing infrastructure module returns one or more configurations in a layout planning recommendation that satisfy the requirement information, if such configurations exist. The configurations may not exist if the sizing infrastructure module is unable to determine a configuration that successfully supports the requirement information. In one embodiment, the sizing infrastructure module can be advantageously implemented separately from any single application program so that it can receive calls from multiple application programs. The implementation of an application program that calls routines in the sizing infrastructure module can take any form, as long as the application program can make calls and receive results that are formatted according to the specifications of the sizing infrastructure module.

As described herein, the sizing infrastructure module may be implemented on one computer that is separate from one or more computers that implement the calling application program. Also, the sizing infrastructure module, in another embodiment, may be implemented on a computer, such as a management console that is connected to the data storage system. In another embodiment, the sizing infrastructure module is used to monitor performance (e.g., statistics) of the available resources of a current configuration of the data storage server, and generate a layout recommendation suggesting a change in current configuration that may be more evenly load balanced than the current configuration of the data storage system.

An even utilization of resources allows for a balanced deployment of resources for the given application. The embodiments described herein describe generating a layout planning recommendation on how to layout the workload groups on the set of physical resources, and where to place the workload groups and physical resources to ensure an even utilization of resources. For example, the embodiments describe herein are configured to determine the amount and type of physical resources (e.g., the number and/or type of storage servers and the number and type of disks) that would support the input workload groups, and are configured to generate recommendation(s) or guidance on how to layout the workload groups on those physical resources and/or where to place the workload groups to ensure an even utilization of resources for a balanced deployment of resource. The embodiments described herein also allow for a balanced deployment of resources for a given application.

In one embodiment, a layout planning recommendation that permits a balanced deployment of physical resources is generated by mapping the workload groups to the storage resources (e.g., storage servers and storage devices) in a more optimal way than was possible with prior tools. Mapping the workload groups to the storage resources may present some problems. These classes of problems are typically called "bin packing" problems. In computational complexity theory, the bin packing problem is a combinatorial Non-deterministic Polynomial-time hard (NP-hard) problem (or NP-complete), and consequently, all "bin packing" algorithms are not deterministic algorithms. Since it is NP-hard, the most efficient known algorithms use heuristics to achieve very good, and/or optimal bin packing results. Generally speaking, in bin packing, objects of different volumes must be packed into a finite number of bins of capacity V in a way that minimizes the number of bins used. More particularly, in storage planning, workload groups of different sizes must be packed into a finite number of physical resources in a way that minimizes the number of bins used. The finite number of physical resources may include one or more storage servers that are associated with one or more storage devices or volumes. Accordingly, a heuristic method may be used to generate a layout planning recommendation that permits load balancing the workload groups of different sizes to be packed (e.g., mapped) into the finite number of physical resources for a balanced deployment of physical resources.

Bin packing may include two-dimensional packing, linear packing, packing by one or more parameters, or the like. Examples of bin packing algorithms include Worst-Fit bin packing algorithm, First-Fit bin packing algorithm, Best-Fit bin packing algorithm, First-Fit-decreasing bin packing algorithm, Next-Fit, or the like. The Worst-Fit and Best-Fit is in terms of packing efficiency, for example, the goal in using Best-Fit bin packing algorithm is to leave as little space in any bin as possible, and the goal in using Worst-Fit bin packing algorithm is to leave as much space as possible and spread the packing to all the bins as much as possible. An example of Worst-Fit bin packing algorithm is described below with respect to Method A, and an example of First-Fit bin packing algorithm is described below with respect to Method B. Alternatively, other bin packing algorithms may be used, such as First-Fit-Decreasing bin packing algorithm, Next-Fit, Best-Fit, or the like. The First-Fit-Decreasing bin packing algorithm can operate by first sorting the items to be inserted in decreasing order by volume, and then inserting each item into the first bin in the list with sufficient remaining space. Bin packing algorithms, including bin packing heuristics, are known by those of ordinary skill in the art, and accordingly, a more detailed description of these algorithms has not been included.

In one embodiment, the method includes performing two bin packing algorithms (e.g., 2-dimensional bin packing) that use two parameters, performance requirements and capacity requirement. It should be noted that the performance requirement parameter corresponds to the available processing resources of each of the storage servers of the set of available physical resources, and the capacity requirement parameter corresponds to the available capacity resources of each of the storage servers of the set of available physical resources. The method includes determining which bin packing algorithm produces the least variance on a one of the two parameters (e.g., a selected parameter). In one embodiment, the selected parameter is the performance requirements, and is more important than the other parameter, capacity requirements. In another embodiment, the selected parameter is capacity requirements. The method may include determining heuristically which bin packing algorithms can perform a successful packing in such a way to achieve least variance on the most important parameter. Alternatively, additional bin packing algorithms (e.g., three or more total bin packing algorithms), additional parameters, and/or different types of parameters may be used.

In one embodiment, the method includes combining two bin packing algorithms, such as Worst-Fit and First-Fit bin packing algorithms, and determining which bin packing algorithm produces a successful packing with the least variance on a selected parameter (e.g., least variance on the available processing requirements on each storage server after mapping the one or more workload groups to the available physical resources).

The embodiments described herein may be implemented in storage planning or capacity planning tools. In particular, the embodiments may be implemented in sizing or capacity planning tools to maximize the bin packing to generate a layout planning recommendation that optimizes field deployment of the physical resources. The embodiments described herein may also be implemented in other systems to generate a layout planning recommendation that optimizes the utilization of the available physical resources, such as data manageability tools. Alternatively, the embodiments described herein may be implemented in data manageability tools (e.g., Operations Manager, formerly DataFabric Manager, available from Network Appliance, Inc., of Sunnyvale, Calif.) that automatically perform data optimizations based on layout planning algorithms, or systems that load balance and tune themselves (e.g., self-tuning) based on layout planning algorithms. For example, the embodiments described herein may be used in a data manageability tool to perform reorganization of existing deployments in an effort to ensure a more even utilization of the available physical resources for a balance deployment. The data manageability tool may monitor the current utilization of the physical resources of the system, and if the variance of the available resources across the storage servers increases beyond a predetermined threshold, the layout planning recommendation module may be invoked to determine a new layout planning recommendation that minimizes the variance on the selected parameter. Alternatively, the layout planning recommendation may access a stored layout planning recommendation that includes a lower variance on the selected parameter than the current layout.

Figure 3:
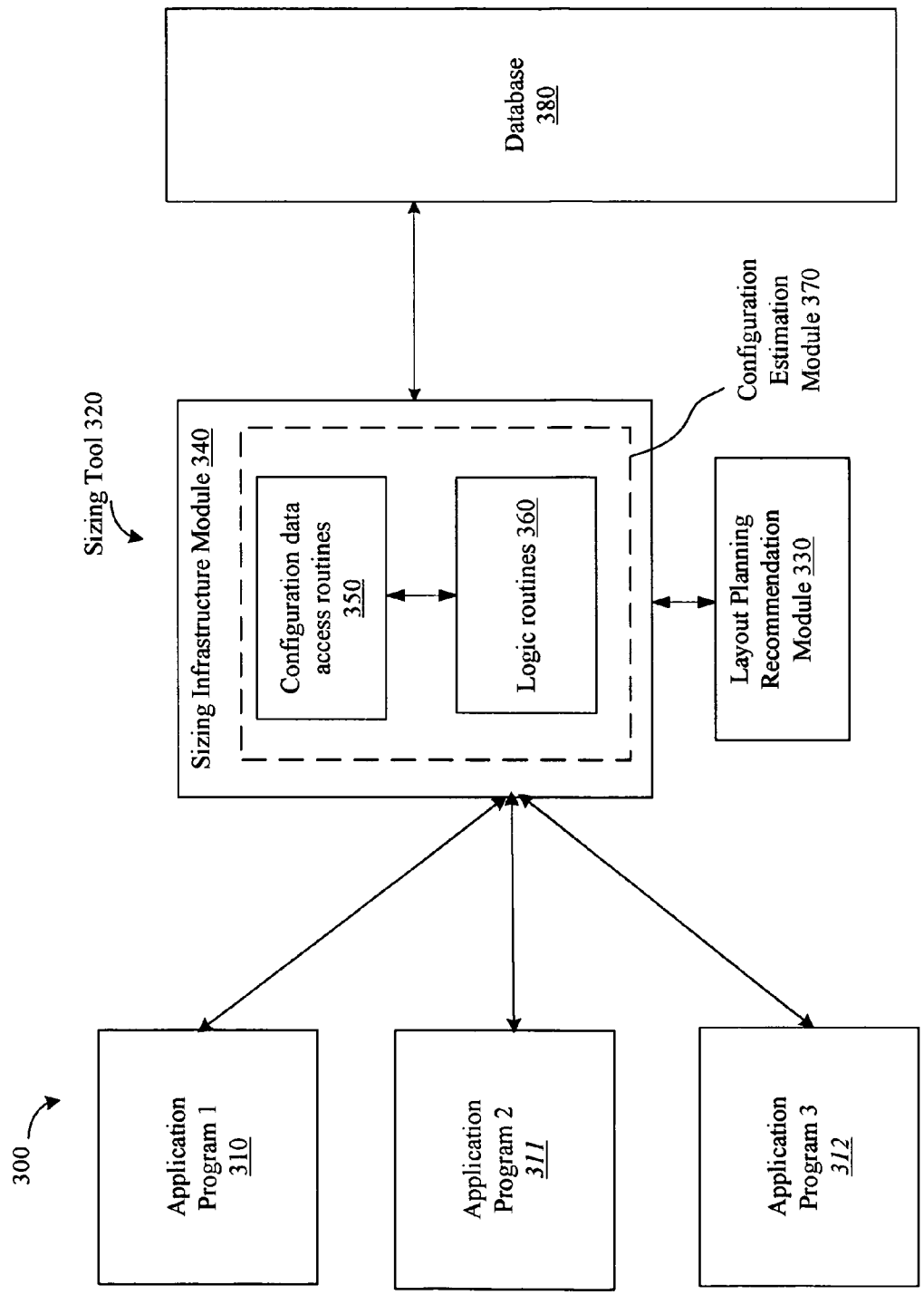
FIG. 3 is a block diagram of one embodiment of a system for generating a layout planning recommendation of a set of physical resources of a data storage system, including application programs, a sizing tool, and a database.

FIG. 3 is a block diagram of one embodiment of an electronic system for generating a layout planning recommendation of a set of physical resources of a data storage system, including application programs 310-312, a sizing tool 320, and a database 380. System 300 includes application programs 310, 311, and 312 (e.g., sizing or capacity planning application programs), each of which implements a user interface and application logic. The application programs may be, for example, sizing tools, capacity planning tools, or sizing and capacity planning tools. It should be noted that sizing and capacity planning tools can be one in of the same. The distinction between the two is small, in that the sizing tools may help the system architect or administrator choose a proper system initially, when the capacity planning tools generally help the system architect or administrator further plan the system during operation in terms of how to keep the system functioning properly. The sizing and capacity planning tools may be, for example, Exchange Sizer, a Database Sizer, a Custom Application Sizer, a Sizer Request-For-Extensions (RFEs), or the like.

System 300 also includes a sizing infrastructure module 340, which includes one or more configuration data access routines 350 and one or more logic routines 360 (e.g., a configuration estimation routine and/or a layout planning recommendation routine). The configuration data access routines 350 and one or more logic routines 360 may be implemented in configuration estimation module 370. The configuration estimation module 370 may be configured to receive calls from one or more applications (e.g., 310-312), called calling application programs. The calls from the one or more applications may include one or more workload groups and/or information indicative of the available physical resources. As described above, the one or more workload definitions may be the input variables from the user or sizing tool, such as, for example, the number of users the computer system has, how that storage should be structured (e.g., how many hosts and what type of reliability options should be used), a capacity requirement, a performance requirement, a reliability requirement, general configuration requirements, and/or one or more workload definitions. The one or more workload definitions may have, for example, a respective associated required throughput that is included in the performance requirement. The configuration data access routines 350 and the logic routines 360 retrieve data from a database 380. The database 380 can be organized in any convenient fashion, including as a relational database, a hierarchical database, or one or more structured or unstructured text documents. An application program, such as application program 310, makes calls to the configuration data access routines 350 and to the logic routines 360. The sizing tool 320 can be located remotely, and the application program 310 can call the sizing tool 320 over a network connection.

In one embodiment, the layout planning recommendation module 330 is implemented as a separate module from the sizing infrastructure module 340, and may separately include configuration data access routines and logic routines (e.g., similar to configuration data access routines 350 and logic routines 360). For example, the sizing infrastructure module 340 determines a solution of the number, and/or types of the available physical resources that supports the workload groups, as indicated by information sent from calling application program, and sends the solution to the layout planning recommendation module 330 to generate a layout planning recommendation of the set of available physical resources that supports the workload groups. The layout planning recommendation module 330 may also perform the operation of load balancing the workload groups to the set of available physical resources. Although the layout planning recommendation module 330 is illustrated as being coupled to the sizing infrastructure module, alternatively, the operations of the layout planning recommendation module 330 may be implemented within the sizing infrastructure module 340. For example, the operations of the layout planning recommendation module 330 may be implemented in the logic routines 360 as a routine that generates the layout planning recommendation. In this embodiment, the layout planning recommendation module 330 is coupled configured to receive information indicative of a set of available physical resources and one or more workload groups from a configuration estimation module (or routine) of the sizing infrastructure module 340 and to automatically load balance the one or more workload groups to the set of available physical resources based on the information. The one or more workload groups each include storage resource requirements, for example, a processing requirement and a capacity requirement. Alternatively, the storage resource requirements may be other types of resources. The information indicative of a set of available physical resources may include a number and/or a type of the physical resources, for example, storage servers, aggregates, storage volumes, disks, or the like. These physical resources may be load balanced to support the one or more workload groups indicated by the calling application program.

The sizing infrastructure module 340, including the configuration estimation module 370 and/or the layout planning recommendation module 330 may be implemented in specially-designed hardware circuitry (e.g., a field programmable gate array (FPGA), an application-specific integrated circuit (ASIC), programmable logic device (PLD), etc), in software and/or firmware in conjunction with programmable circuitry, or any combination thereof.

In one embodiment, the sizing infrastructure module 340 is an Extensible Markup Language (XML) Remote Procedure Call (RPC)-based implementation of an application programming interface (API). The application program 310 communicates with the routines in the sizing infrastructure module 340 by sending XML-RPC requests over HyperText Transfer Protocol (HTTP) connections. Results are received back as XML strings. Each XLM-RPC request contains a sequence of XML tags. In a Java implementation of the sizing infrastructure module 340, the request can be sent to a Java servlet that forwards the request to the appropriate routine. For example, each XML-RPC request can take the following form:

```
<?xml version="1.0"?>
<methodCall>
<methodName>SI.APIname</methodName>
<params>
<param><value><value type>parameter value</value type></value></param>
..................
<param><value><value type>parameter value</value type></value></param>
</params>
</methodCall>
``` where parameter value can be a name and associated value (respectively enclosed, for example, with <name></name> and <value></value> XML tags) for a parameter of the request or can be a structure or data array including multiple names and values. Examples of possible parameter names include "usable_capacity," "cpu_headroom," and "drive_type."

The Java servlet packages the response from the API and sends it to the application program in the form of XML tags. For example, each response can take the following form:

```
<?xml version="1.0" encoding="ISO-8859-1" ?>
<methodResponse>
<params>
    <param>
        <value>
            <struct>
                <member>
                    <name>ReturnVariableName1</name>
                    <value>ReturnValue1</value>
                </member>
                ...................
                <member>
                    <name>ReturnVariableNameN</name>
                    <value>ReturnValueN</value>
                </member>
            </struct>
        </value>
    </param>
</params>
</methodResponse>
``` where each ReturnVariableName is the name of a variable being returned to the application program, and each ReturnValue is a value associated with the variable. An example of a possible ReturnVariableName is "Number of Disks," and a possible associated ReturnValue is "19."

Because the sizing infrastructure module 340 is accessible using remote procedure calls over an HTTP connection, the sizing infrastructure module 340 can be called from a computer that is connected to the Internet. This allows sales people or field engineers at a customer site to have a sizing application that uses and presents the most up-to-date configuration information and logic routines. In this embodiment, the sizing infrastructure module 340 and the sizing application execute on two different computers.

In one embodiment, one of the logic routines is a configuration estimation routine that computes possible configurations for a data storage system based on a set of requirements. The configuration estimation routine takes multiple input requirements, such as workload groups, including, for example, capacity requirements, reliability requirements, general configuration requirements, and performance requirements. Examples of capacity requirements are usable capacity (e.g., gigabytes of storage), free space reserve or capacity reserve (e.g., expressed as a percentage of the usable capacity), space reserved for use by the operating system and storage software, and number of spare disks. Examples of reliability requirements are whether the hosts will be clustered, whether degraded failover performance is acceptable, RAID type (e.g., RAID-DP or RAID4), and RAID group size.

Examples of general configuration requirements are the desired host types (e.g., models of file servers), desired disk types (e.g., having a certain capacity, speed, and connection type), desired host operating system version, whether multiple-host configurations should be allowed, the maximum number of hosts and (if the hosts are clustered) host clusters, the minimum number of hosts and host clusters, a global volume type (e.g., either flexible volumes or traditional volumes which are tied to physical disks), and whether configurations where a shelf is partially full should be allowed.

Examples of performance requirements are CPU headroom on the hosts (also referred to as available processing resources), overhead caused by multiple workloads, and a fragmentation factor that accounts for fragmentation of data already stored on the system. The performance requirements include a workload definition structure that includes one or more of a required throughput (e.g., in MB/s or input/output operations per second), a workload definition, a protocol, and a desired volume type for the workload. Each workload definition has four parts: sequential reads, sequential writes, random reads, and random writes. For each part, the workload definition specifies the percentage (from 0% to 100%) of the workload's accesses that the part accounts for and the size of operations (e.g., average size or worst-case size), latency constraints, and the total space actively accessed (working set size) for the respective part.

The configuration estimation routine outputs one or more suggested configurations. Each configuration typically includes the type of host, the number of hosts and host clusters that are needed, the number of disks needed for reads, the number of disks needed for writes, the total number of disks needed (which includes the number of parity disks needed to construct RAID groups), and the number of shelves needed. Each configuration typically also includes a ratio of disk operations to host operations for random reads, the system utilization for the sizing scenario, the capacity utilization with the number of disks suggested, the determining factor for the configuration (e.g., capacity, throughput, or latency), and a suggested layout for the hardware and software.

Communications between an application program and the sizing infrastructure module have been described as using XML-RPC communication. In an alternative implementation, application programs submit sizing requests to the sizing infrastructure module as a dynamic form, and the servlet parses all of the required inputs from the form. In this implementation, XML-RPC communication is not used. The application program can reside on the same computer as the servlet, or the application program can communicate with the servlet over a network.

In another alternative implementation, the sizing infrastructure module is an executable that is used as a library from multiple application programs. In this implementation, the sizing infrastructure module can reside on the same computer as the application programs, as can the database 380 that is accessed by the sizing infrastructure module. The database 380 can be synchronized periodically to keep it up-to-date.

When an application program such as a sizing tool or a capacity planning tool is accessed (e.g., by a user, i.e., a storage architect, or a storage administrator, opening the application program or clicking on a link to a web-based application), the application program calls one or more configuration data access routines that are part of a sizing infrastructure module. The configuration data access routines access a database 380 to retrieve information about the hardware, software (e.g., operating system versions), protocols (e.g., NFS, CIFS, iSCSI, and Fibre Channel protocols), and options that currently can be used to generate a configuration for a data storage system. The information typically includes host types, disk types, reliability options (e.g., types of RAID that are supported), supported protocols and operating system versions, other storage-related software versions, and default values for variables such as RAID group size, CPU headroom (e.g., available processing resources), and capacity headroom (e.g., available capacity resources). The database 380 can be stored on the computer system where the configuration data access routines execute or can be stored on a remote computer system and accessed over a network connection. The database 380 initially can be populated with data, and subsequently updated, manually (e.g., editing a database file by hand) or automatically (e.g., using a database upload function executed on a remote server). As the database 380 is updated, up-to-date information becomes available to the configuration data access routines, making it unnecessary to individually update the internals of an application program that obtains configuration information using the configuration data access routines. The configuration data access routines return the current information to the application program, and the application program makes the information available to a user (e.g., populates a user interface with the information).

The user inputs sizing or capacity-planning requirements to the application program, (e.g., capacity, performance, and reliability requirements). If necessary, the application program converts the user inputs into a format that logic routines in the sizing infrastructure module accept as input. For example, in a sizing application for an e-mail system, the user might input the requirements to the application program in terms of a number of e-mail users, the average mailbox size of each user, and the average (or maximum) number of e-mail messages per day. The application program converts these user-entered requirements into inputs suitable for the logic routines, such as required capacity and throughput.

In one embodiment, a user interface, such as a command line interface (CLI) and/or a graphical user interface (GUI) may be provided to allow a user (e.g., system architect or administrator) to access the sizing module that includes the layout planning recommendation module. The user interface may be implemented on the computer that executes the application program that calls the routines. The user interface may include a display, which displays the user input fields that are to be input by the user. For example, the user interface may include one or more fields for mapping application level entities (e.g., logs, databases, or storage groups) to one or more workload groups, such as aggregates). The user interface may also include a button that may be activated to call the routines of the sizing module. Alternatively, other user interfaces known by those of ordinary skill in the art may be used to allow a user to enter the user inputs and/or map application level entities to the one or more workload groups.

It should be noted the user inputs may be input directly into the application program from the user, for example, by using the user interface described above, or alternatively, may be stored in memory from previous user entry. Alternatively, the user inputs may be generated without user interaction. For example, in one embodiment, the data storage system is configured to monitor the usage of the physical resources in a particular layout configuration, and data regarding this usage is stored in memory as the user inputs. This data may be used to generate a new layout planning recommendation.

In one embodiment, the user, depending on ease or difficulty of deployment, best practices, etc, specifies the mapping of application level entities (e.g., logs, databases, or storage groups) to one or more workload groups (e.g., aggregates), and subsequently call the layout planning algorithm. The layout planning algorithm returns back the layout planning recommendation. The output may include the user specified mappings of the application level entities to the workload groups, as well as the load balanced layout of the workload groups to the physical resources, as described and explained with respect to FIG. 10 below. The user may enter these inputs in an application running on a local computer and access the layout planning algorithm on a remote computer over a network. Alternatively, both the application program and layout planning algorithm run on the same computer either locally or remotely. The application program may include a user interface, such as a graphical user interface (GUI) for entering the inputs and calling the layout planning algorithm, such as by clicking on a button of the GUI (e.g., "Get Layout").

The application program then calls one or more configuration estimation routines. The configuration estimation routine accesses additional information from the database 380 as needed (e.g., by calling a retrieval routine). The additional information from the database 380 can include empirical data that is used by modeling logic in the configuration estimation routine and default values for input values that were not specified by the application program's call. The configuration estimation routine executes modeling logic on the inputs received from the application program and the database 380 to compute one or more system configurations that satisfy the user's requirements, if such a configuration exists. If the configuration estimation routine cannot satisfy the user's requirements, it can generate an error or set the system configuration to "not possible." Each system configuration typically includes a host type and number of hosts, disk type and number of disks, number of networking cards, operating system version, and protocol. The system configuration can also include associated information, such as projected system utilization, reliability, and layout information (e.g., how the storage devices should be arranged), as described in more detail below.

The configuration estimation routine returns the one or more system configurations to the application program. The application program can present the system configurations directly to the user or convert the system configurations to an application-specific format for presentation to the user. For example, a number of storage devices in a system configuration returned by the configuration estimation routine can be converted by the application program into a number of database disks and a number of log disks before being presented to the user.

In another embodiment, the configuration estimation module 370 determines the amount and/or type of available physical resources. This may be done by receiving from a calling application program (e.g., 310, 311, or 312) a capacity requirement and a performance requirement, wherein the performance requirement includes one or more workload definitions. The one or more workload definitions may have, for example, a respective associated required throughput that is included in the performance requirement. The configuration estimation module 370 may calculate a configuration for the data storage system based on the capacity requirement and the performance requirement. The configuration may include the required number of storage volumes using the required throughputs, for example, the number of storage devices, and the required number of storage servers to support the workload definitions. The workload definitions may be classified as workload groups. The configuration may be output to the layout planning recommendation module 330 (or alternatively, the configuration estimation routine may perform the operations of the layout planning recommendation module 330) to perform load balancing on the configuration determined by the configuration estimation module 370, and to generate the layout planning recommendation base on the load balancing. The layout planning recommendation, including the number and/or types of physical resources, such as storage servers and storage devices, may be returned to the calling application program (e.g., 310, 311, or 312).

The layout planning routine and the calling application program each execute on a respective computer, and communication between the respective computers takes place over network. The calling application program may transmit the capacity requirement, the performance requirement to the layout planning routine through an XML remote procedure call over an HTTP connection.

In an alternative implementation, the application programs submit layout planning requests to the sizing infrastructure module as a dynamic form, and the servlet parses all of the required inputs from the form. In this implementation, XML-RPC communication is not used. The application program can reside on the same computer as the servlet, or the application program can communicate with the servlet over a network.

In another alternative implementation, the layout planning module is an executable file that is used as a library from multiple application programs. In this implementation, the layout planning module can reside on the same computer as the application programs.

Figure 4:
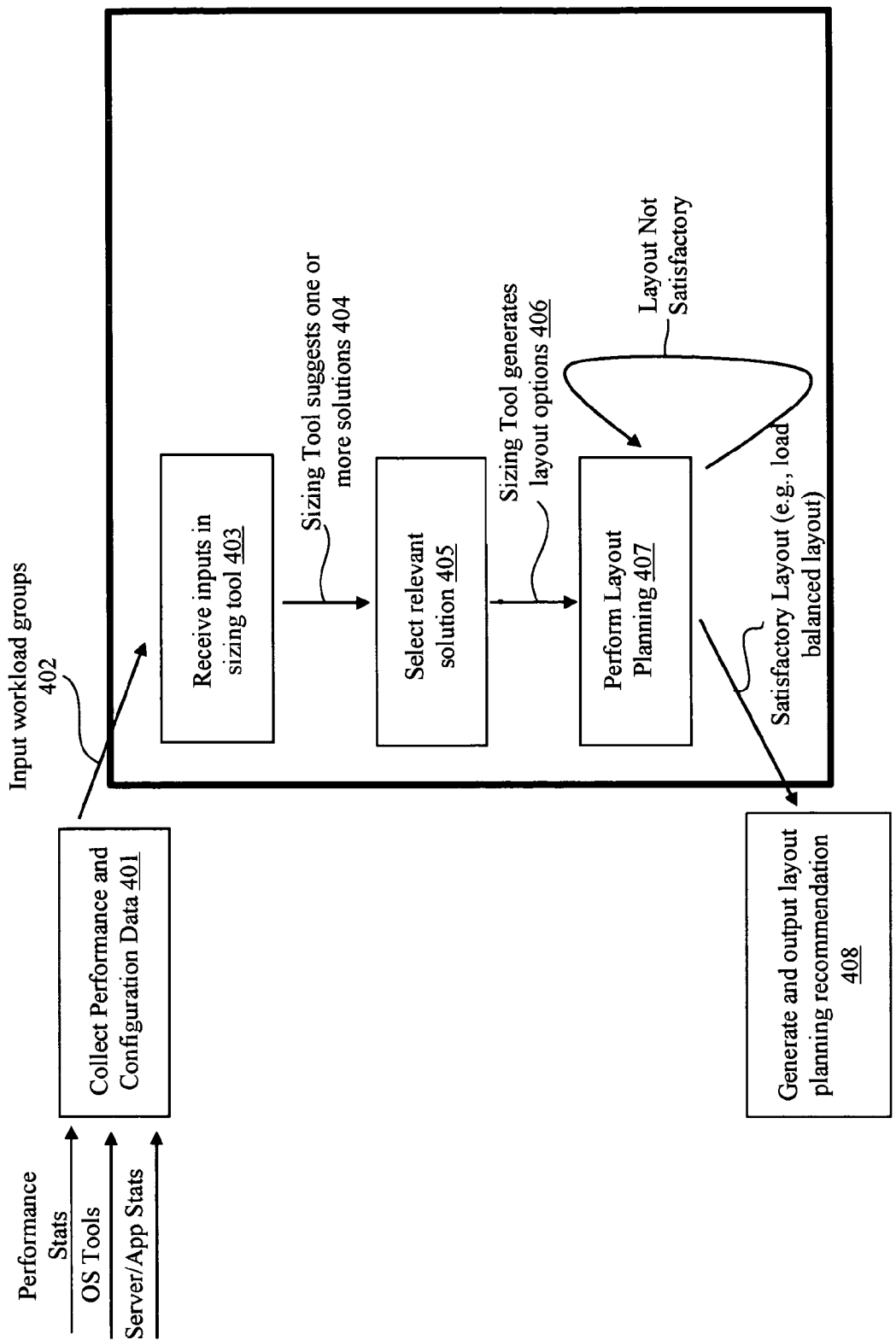
FIG. 4 is a flow chart of one embodiment of the method for generating a layout planning recommendation.

FIG. 4 is a flow chart of one embodiment of the method for generating a layout planning recommendation. Method 400 includes an operation to collect performance and configuration data, operation 401. The performance and configuration data may include the performance requirements and capacity requirements of one or more workload groups, performance statistics, operating system (OS) tools, and/or server/application statistics. Alternatively, other types of input data may be collected to be used by the sizing tool to generate a layout planning recommendation.

Once, the data has been collected the workload groups are input into the sizing tool, operation 402, and the input workload groups are received in the sizing tool, operation 403. After receiving the inputs, the sizing tool suggests one or more solutions, operation 404. The one or more solutions may include information indicative of a set of available physical resources that can support the workload groups. The sizing tool selects the relevant solution from the one or more suggested solutions, operation 405. In one embodiment, the method includes generating one or more layout planning options for the layout planning recommendation, operation 406. Alternatively, the relevant solution, as selected in operation 405, may be used in layout planning without the sizing tool generating one or more layout planning options. After the relevant solution has been selected in operation 405 (e.g., whether operation 406 is performed or not), the sizing tool performs layout planning, operation 407. Layout planning may include load balancing the workload groups to the set of available physical resources suggested and selected in operations 404 and 405. To load balance, the sizing tool may perform a two-dimensional bin packing process (e.g., two different bin-packing algorithms), selecting a successful packing result with the least variance on one of the two parameters used in the two-dimensional bin packing process (e.g., performance requirements and capacity requirements).

Once the layout planning has been performed, the sizing tool determines if the layout planning was successful or not in bin packing the workload groups to the set of available physical resources. The layout planning is successful if all the workload groups are assigned to the available physical resources. If the layout planning was not successful, the layout planning of operation 407 is repeated. In one embodiment, upon determining that the layout planning was unsuccessful, the sizing tool returns a message to a user to suggest splitting the one or more workload groups into additional workload groups. In effect this causes the method to return to operation 401. Alternatively, the sizing tool may automatically split the one or more workload groups into additional workload groups and perform the layout planning in operation 407 again.

Upon determining that the layout planning of operation 407 is successful, the sizing tool generates a layout planning recommendation, operation 408. The sizing tool may output the layout planning recommendation to a user.

It should be noted that the embodiments described above have been described with respect to a sizing planning tool that receives input and generates an output to a user. Alternatively, the embodiments may be implemented in a capacity planning tool, and may be implemented in a system that receives the input from a calling application program that is operated by a user and outputs the layout planning application to the user through the calling application program. In addition, the operations of the method describe above may be implemented by a single sizing tool that resides on one computer. Alternatively, the operations of the method may be implemented on separate computers and communicate over a network, such as a calling application program of a sizing tool and a sizing infrastructure module that is located on a separate computer as described herein.

Figure 5:
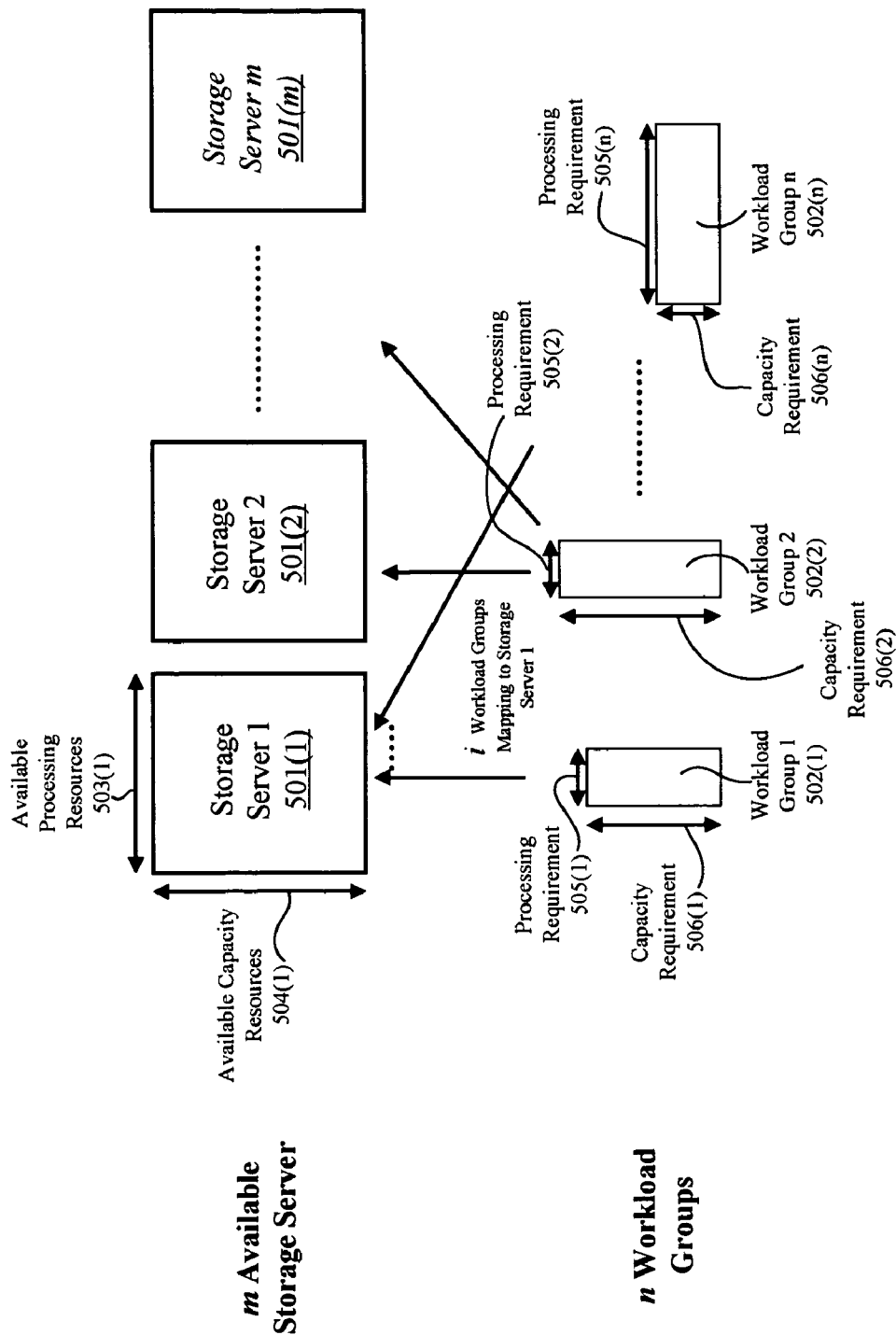
FIG. 5 illustrates one embodiment of load balancing multiple workload groups to a set of available physical resource.

FIG. 5 illustrates one embodiment of load balancing multiple workload groups 502 to a set of available physical resources 503 and 504. The load balancing of this embodiment is performed using a two-dimensional bin packing process that considers 1) the amount of processing required by each of the workload groups (e.g., processing requirement 505) and the number of storage devices in each workload group (e.g., capacity requirement 506) as the two bin packing parameters. In this particular embodiment, the performance requirement 506 is selected as the more important parameter. The set of available physical resources includes the amount of available processing resources 503 (e.g., number of processors or CPU headroom) on each storage server and the amount of available capacity resources (e.g., number of storage devices supported a storage server or capacity headroom) that can be supported by each storage server. The bin packing process is performed to map the multiple workload groups 502(1)-502(n) to the available resources, such as the storage servers 501(1)-501(m), which include the available processing and capacity resources 503(1)-503(m) and 504(1)-504(m). This bin packing process includes two algorithms, listed as Method A and Method B.

The first bin packing algorithm, Method A, includes mapping one or more workload groups 502 to the storage server 501 which has the maximum amount of available processing resources 503 and can also support the capacity requirement 506 (e.g., number of storage devices required) of the one or more workload groups 502. The second bin packing algorithm, Method B, includes mapping one or more workload groups 502 to a particular storage server (e.g., storage server 501(1)) until it does not have enough available processing resources 503 and then move on to the next storage server (e.g., storage server 501(2)). In another embodiment, the method B includes mapping one or more workload groups 502 to a particular storage server until it does not have enough available processing resources 503 or cannot support the capacity requirement 506 (e.g., number of storage devices required) in the one or more workload groups 502 and then move on to the next storage server.

If both Method A and Method B succeed in assigning all the workload groups 502 to the available number of storage servers 501, then the sizing tool selects the bin packing layout from the method which has the least variance on the available processing resources 503 on each storage server after the mappings. If only one of Method A and Method B are successful in assigning all the workload groups 502 to the available storage servers 501, the sizing tool selects the bin packing layout from the method which was successful.

If none of the methods succeed, the sizing tool may determine if both of the methods was unsuccessful because of not having enough available processing resources 503 on any of the storage servers 501. If this condition is satisfied, the sizing tool may return a message and suggest the workload groups 502 to be split into more workload groups (e.g., in decreasing order of available processing resources).

However, if none of the methods succeeded and at least one of them did not succeed due to the storage servers 501 not being able to support the capacity requirement 506 (e.g., number of storage devices required) of all the workload groups, the sizing tool may perform two more additional bin packing algorithms, Method C and Method D. The third bin packing algorithm, Method C, includes mapping one or more workload groups 502 to the storage server that can still support the capacity requirement 506 and the processing requirement 505 of the one or more workloads 502, for example, the storage server that can still support the maximum number of storage devices and has the amount of available processing resources 503 which can support the one or more workload groups 502. The fourth bin packing algorithm, Method D, includes mapping one or more workload groups 502 to a particular storage server until it cannot support more storage devices to fit any additional workload group 502, and then moving on to the next storage server 501. In another embodiment, the method includes mapping one or more workload groups 502 to a particular storage server 501 until it cannot support more storage devices to fit any additional workload group or does not have enough available processing resources 503, and then moving on to the next storage server.

If both Method C and Method D succeed in assigning all the workload groups 502 to the available number of storage servers 501, then the sizing tool selects the bin packing layout from the method which has least variance on the available processing resources 503 on each storage server 501 after the mappings. Otherwise choose the layout from whichever method succeeds in assigning all the workload groups 502 to the available storage servers 501.

If none of the methods succeed, the sizing tool may return a message and suggest the workload groups 502 to be split into more workload groups (e.g., in decreasing order of available processing resources).

In another embodiment, if both Method A and Method B are unsuccessful in assigning all the workload groups 502 to the physical resources (e.g., the available number of storage servers 501), the sizing tool may perform two more additional bin packing algorithms other than Worst-Fit and First-Fit bin packing algorithms of Method C and D, respectively, such as Next-Fit, Best-Fit, First-Fit-Decreasing bin packing algorithms, or the like.

Figure 6:
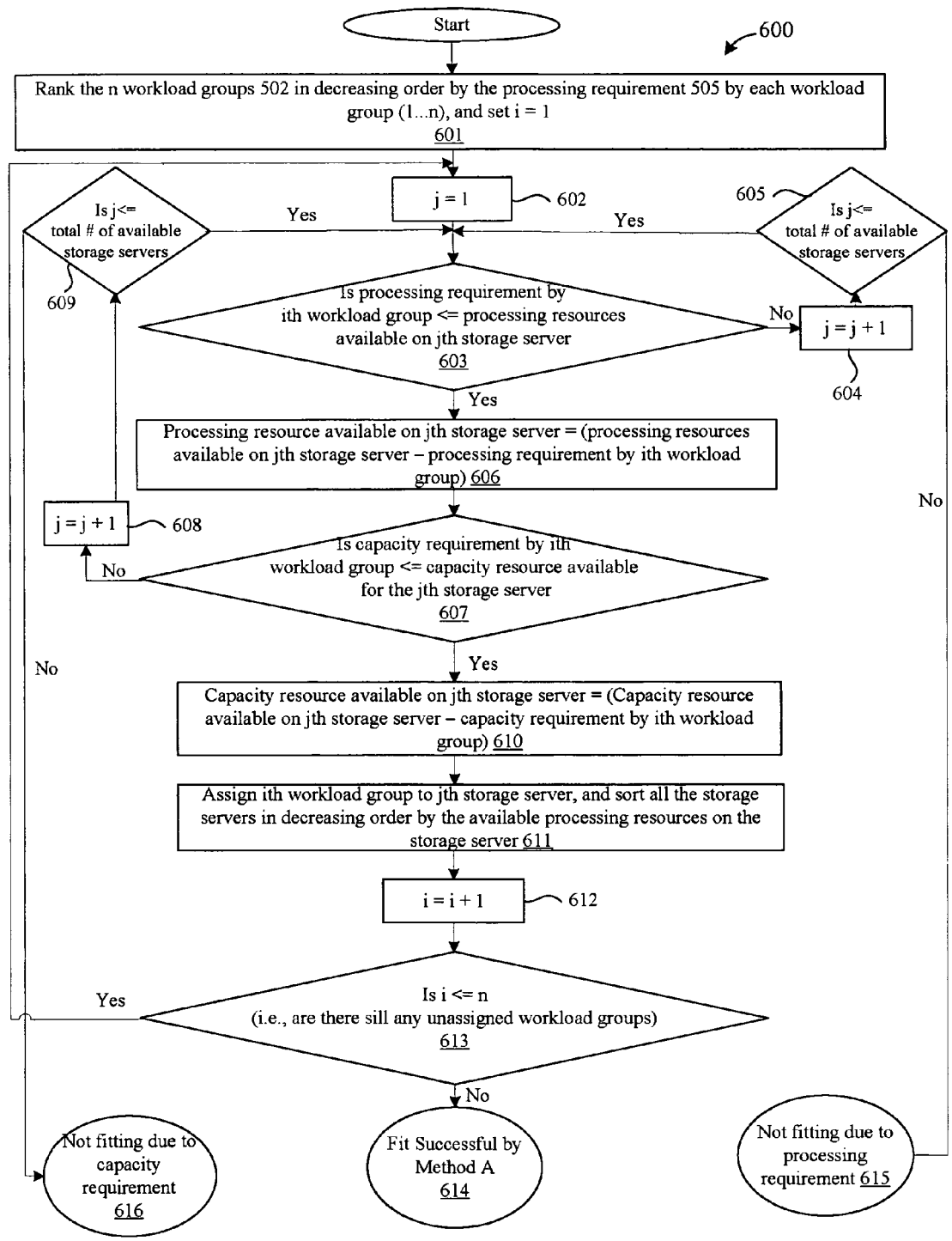
FIG. 6 is a flow chart of one embodiment of a method for bin packing.

FIG. 6 is a flow chart of one embodiment of a method for bin packing. Method 600 includes, first, ranking the n number of workload groups 502(1)-502(n) in decreasing order by the processing requirement 505 by each workload group (e.g., 1 . . . n), and setting i=1, operation 601. For each workload group i (where i varies from 1 to n, and for each storage server j (where j varies from 1 to m), the following is performed. Next, the method includes setting j=1, operation 602. The method 600 also includes a first decision block that determines if the processing requirement 505(i) of the ith workload group 502(i) is less than or equal to the available processing resources 503(j) of the jth storage server 501(j), operation 603. If the condition of the decision block is not met, then the method proceeds with setting j=j+1 (e.g., incrementing the selected storage server by 1), operation 604, and proceeding to the decision block 605, which determines if j is equal to or less than the total number (n) of available storage servers 501, operation 605. If the condition of this decision block is not met, the bin packing method determines that the bin packing is unsuccessful due to the processing requirement 505, operation 615. Operation 615 may include returning a message to a user to suggest splitting the one or more workload groups 502 into additional workload groups. However, if the condition of decision block 615 is met, the bin packing method returns to perform operation 603.

Upon determining, at decision block 603, that the processing requirement 505(i) is less than the available processing resources 503(j), the method includes setting the available processing resources 503(j) of the jth storage server 501(j) equal to the available processing resources 503(j) less the processing requirement 505(i) of the ith workload group 502(i), operation 606. Next, the method includes determining if the capacity requirement 506(i) of the ith workload group 502(i) is less than or equal to the available capacity resources 504(j) for the jth storage server 501(j), operation 607. If the condition of the decision block 607 is not met, the method includes setting j=j+1 (e.g., incrementing the selected storage server), operation 608, and determining whether j is less than or equal to the total number of storage servers 501, operation 609. If the condition of the decision block 608 is not met, the method determines that the bin packing is unsuccessful due to the capacity requirements 506, operation 616. However, if the condition of the decision block 608 is met, the bin packing method returns to perform operation 603.

Upon determining, at decision block 607, that the capacity requirement 506(i) is less than the available capacity resources 504(j), the method includes setting the available capacity resources 504(j) of the jth storage server 501(j) equal to the available capacity resources 504(j) less the capacity requirement 506(i) of the ith workload group 502(i), operation 610.

Upon completion of operation 610, the method includes assigning the ith workload group 502(i) to the jth storage server 501(j), and sorting all the storage servers in decreasing order by the available processing resources 503 on the storage server 501, operation 611. Next, the method includes incrementing i, by setting i=i+1 (e.g., incrementing the selected workload group), operation 612. After incrementing by 1, the method includes determining if i is less than or equal to n, which is the total number or storage servers available 501, operation. If the condition of decision block 613 is met, the method returns to operation 602 and repeats until, the condition of decision block 613 is not met.

If the condition of decision block 613 is not met, the method determines that the bin packing method A was successful in bin packing the n number workload groups 502(1)-502(n) to the m number of storage servers 501(1)-501(m), operation 614. If the bin packing method A was successful, the method includes calculating the variance on one of the parameters (e.g., available processing resources) on each of the storage servers.

In one embodiment, method 600 is Method A. Alternatively, Method A may include other bin packing algorithms known by those of ordinary skill in the art.

Figure 7A:
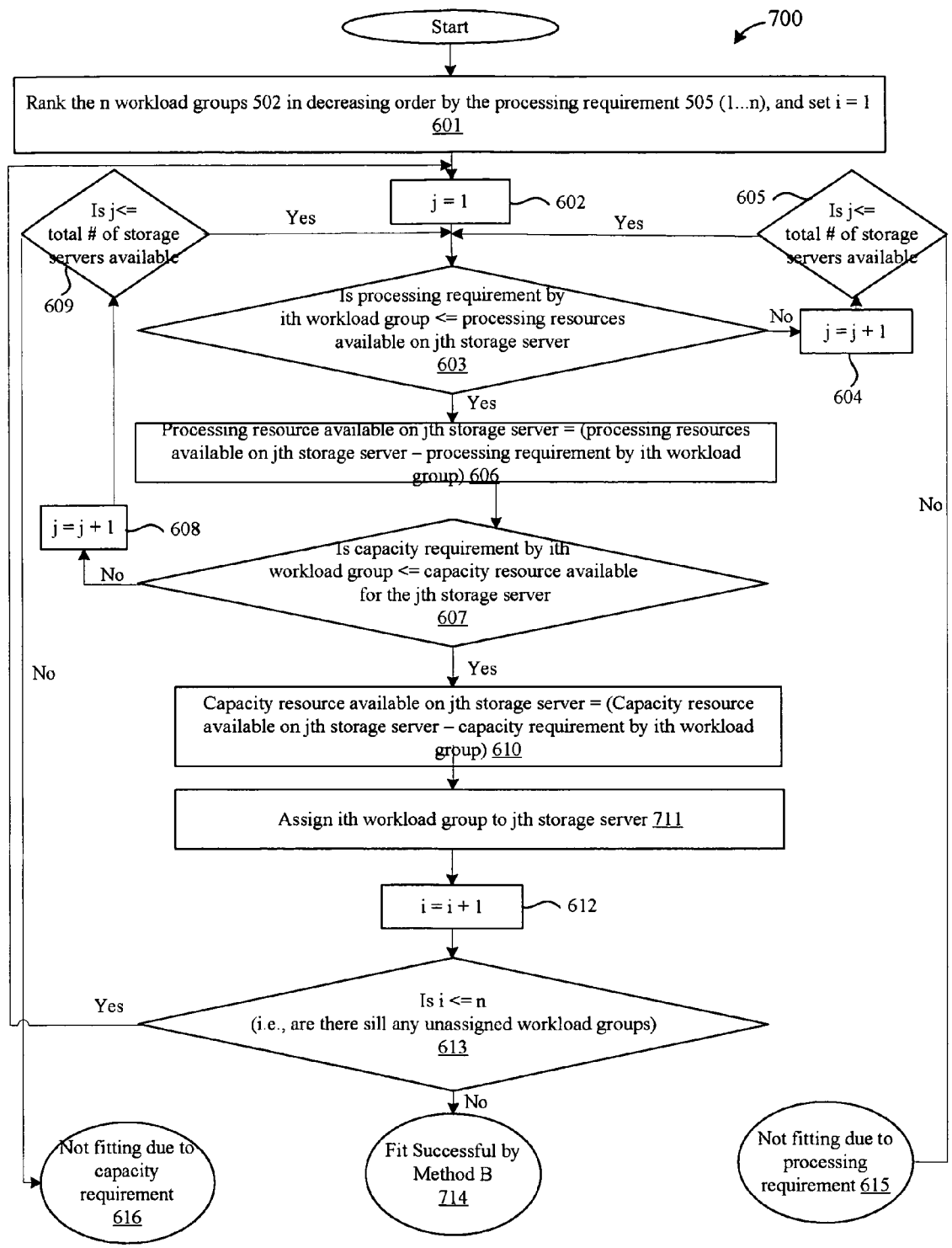
FIG. 7A is a flow chart of another embodiment of a method for bin packing.

FIG. 7A is a flow chart of another embodiment of a method for bin packing. Method 700 is similar to method 600, except operation 711 is substituted for operation 611 and operation 714 is substituted for operation 614. Operation 611 includes assigning the ith workload group 502(i) to the jth storage server 501(j), and sorting all the storage servers in decreasing order by the available processing resources 503 on the storage server 501. However, operation 711 of method 700 includes only assigning the ith workload group 502(i) to the jth storage server 501(j), and does not include sorting all the storage servers in decreasing order by the available processing resources 503. Instead of performing operation 614, if the condition of decision block 613 is not met, the method determines that the bin packing method B was successful in bin packing the n number of workload groups 502(1)-502(n) to the m number of storage servers 501(1)-501(m), operation 714. If the bin packing method B was successful, the method includes calculating the variance on one of the parameters (e.g., available processing resources) on each of the storage servers.

In one embodiment, method 700 is Method B. Alternatively, Method B may include other bin packing algorithms known by those of ordinary skill in the art.

Figure 7B:
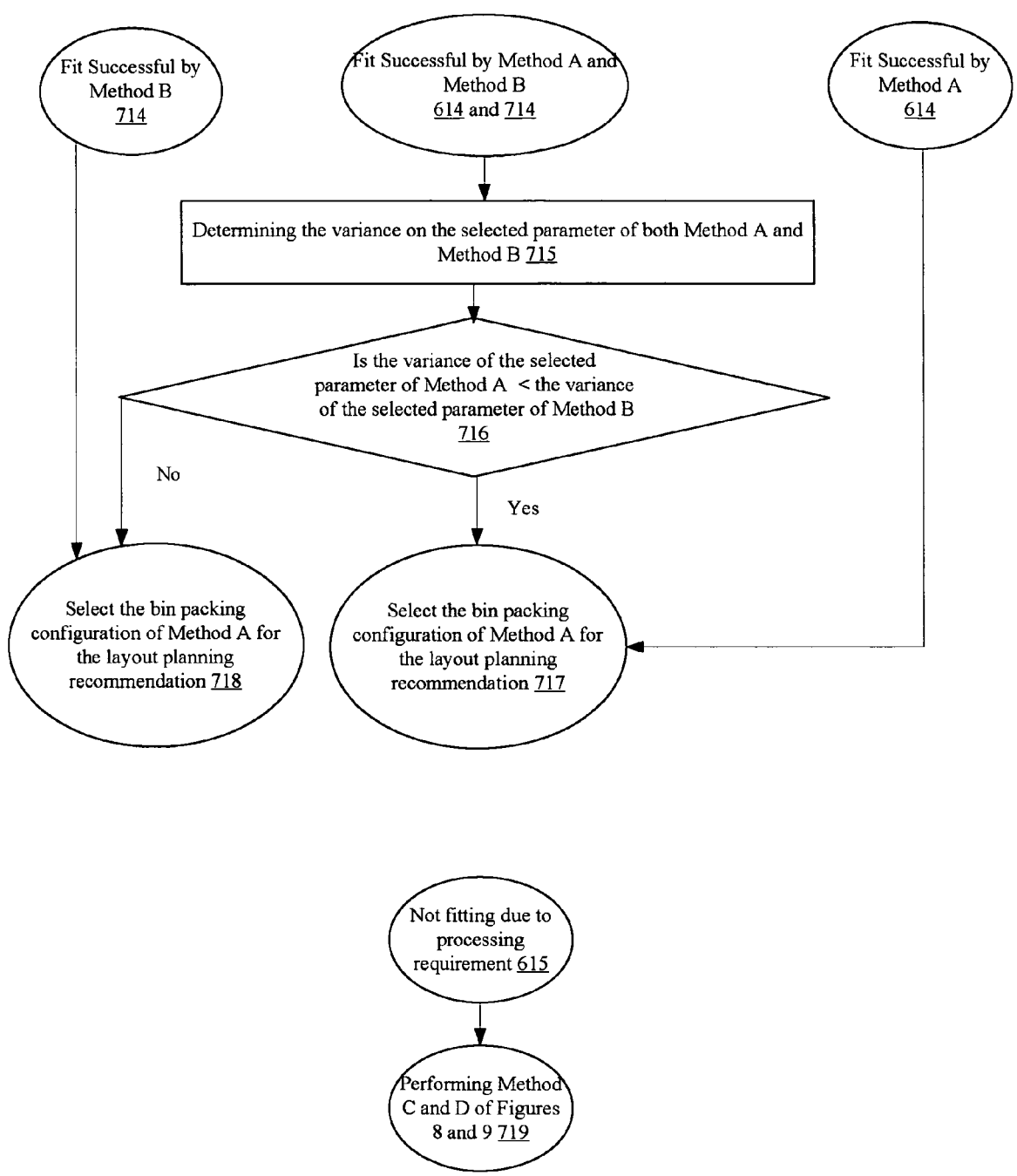
FIG. 7B is a flow chart of one embodiment of a method for load balancing based on methods of bin packing of FIGS. 6 and 7A.

FIG. 7B is a flow chart of one embodiment of a method for load balancing based on methods of bin packing of FIGS. 6 and 7A. If Method A and Method B are both successful in bin packing (e.g., all the workload groups 502(1)-502(n) fit completely, both with respect to the processing requirement 505 and the capacity requirement 506, on the storage servers 501) in operations 614 and 714 of FIGS. 6 and 7A, the method may include determining the variance of one of the selected parameters for both Method A and Method B, operation 715, and determining if the variance of one of the selected parameters (e.g., available processing resources 503 on each storage server 501) of Method A is less than the variance on the selected parameter of Method B, operation 716. If the variance of Method A is less than the variance of Method B, then the method may select the bin packing configuration of Method A to be used for the layout planning recommendation that is returned to the user, operation 717. Otherwise, the method may select the bin packing configuration of Method B to be used for the layout planning recommendation that is returned to the user, operation 718.

However, if only Method A was successful in bin packing in operation 614, the method may include selecting the bin packing configuration of Method A to be used for the layout planning recommendation that is returned to the user, operation 717. Similarly, if only Method B was successful in bin packing in operation 714, the method may include selecting the bin packing configuration of Method B to be used for the layout planning recommendation that is returned to the user, operation 718.

If none of Method A and Method B were successful in bin packing, the method may include determining whether Method A and Method B were not successful due to processing requirement 505 (e.g., not enough available processing resources 503 to support the workload groups 502(1)-502(n) or if Method A and Method B were not successful due to the capacity requirement 506 (e.g., not enough available capacity resources 504 to support the workload groups 502(1)-502(n).

If Method A or Method B was unsuccessful due to the processing requirement 505 in operation 615, the method may include returning a message to the user suggesting to splitting the plurality of workload groups 502(1)-502(n) into additional workload groups.

If Method A or Method B was unsuccessful due to the processing requirement 505 in operation 615, the method may include performing two more bin packing algorithms, such as Method C and Method D, described below, operation 719. It should be noted that Method C and Method D are the same method as Method A and Method B, respectively, however, the main parameter of Method C and Method D is the capacity requirement 506, instead of the processing requirement 505, which is used in Method A and Method B. Alternatively, the method may include returning a message to the user suggesting to splitting the plurality of workload groups 502(1)-502(n) into additional workload groups.

Figure 8:
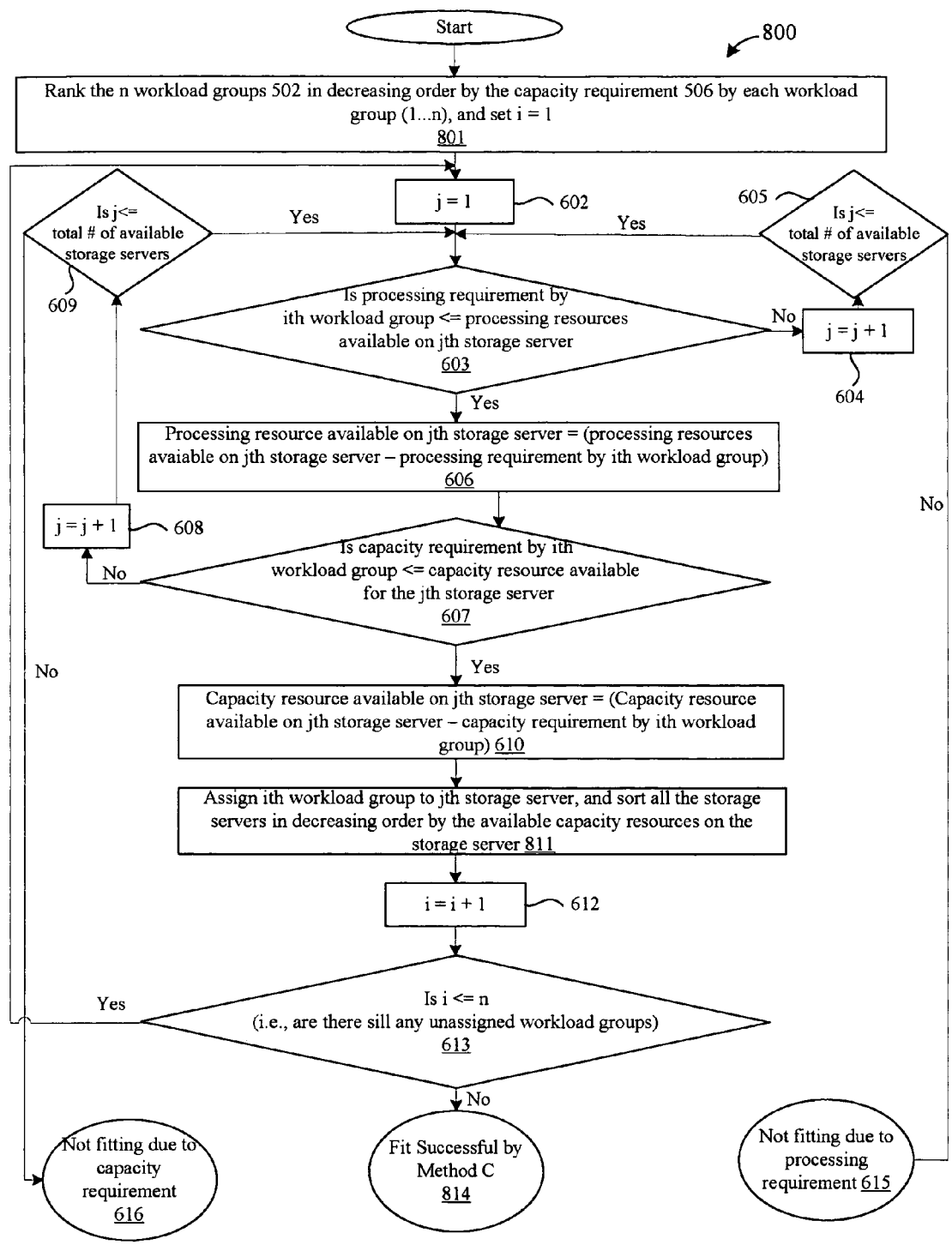
FIG. 8 is a flow chart of another embodiment of a method for bin packing.

FIG. 8 is a flow chart of another embodiment of a method for bin packing. Method 800 is the similar to method 600, except operation 801 is substituted for operation 601, operation 811 is substituted for operation 611, and operation 814 is substituted for operation 614. Operation 601 includes ranking the n number of workload groups 502(1)-502(n) in decreasing order by the processing requirement 505 by each workload group (e.g., 1 . . . n), and setting i=1, operation 601. However, operation 801 includes ranking the n number of workload groups 502(1)-502(n) in decreasing order by the capacity requirement 506 by each workload group (e.g., 1 . . . n), and setting i=1, operation 601. Operation 611 includes assigning the ith workload group 502(i) to the jth storage server 501(j), and sorting all the storage servers in decreasing order by the available processing resources 503 on the storage server 501. However, operation 811 of method 800 includes assigning the ith workload group 502(i) to the jth storage server 501(j), and sorting all the storage servers in decreasing order by the available capacity resources 504 on the storage server 501. Instead of performing operation 614, if the condition of decision block 613 is not met, the method 800 determines that the bin packing method C was successful in bin packing the n number of workload groups 502(1)-502(n) to the m number of storage servers 501(1)-501(m), operation 814. If the bin packing method C was successful, the method includes calculating the variance on one of the parameters (e.g., available processing resources 503) on each of the storage servers 502(1)-502(n).

In one embodiment, method 800 is Method C. Alternatively, Method C may include other bin packing algorithms known by those of ordinary skill in the art.

FIG. 9 is a flow chart of another embodiment of a method for bin packing. Method 900 is similar to method 700, except operation 901 is substituted for operation 601 of method 700 and operation 914 is substituted for operation 614 of method 700. Operation 601 of method 700 includes ranking the n number of workload groups 502(1)-502(n) in decreasing order by the processing requirement 505 by each workload group (e.g., 1 . . . n), and setting i=1, operation 601. However, operation 901 of method 900 includes ranking the n number of workload groups 502(1)-502(n) in decreasing order by the capacity requirement 506 by each workload group (e.g., 1 . . . n), and setting i=1, operation 601. Also, instead of performing operation 614, if the condition of decision block 613 is not met, the method determines that the bin packing method D was successful in bin packing the n number of workload groups 502(1)-502(n) to the m number of storage servers 501(1)-501(m), operation 914. If the bin packing method D was successful, the method includes calculating the variance on one of the parameters (e.g., available processing resources) on each of the storage servers.

It should be noted that operation 811 includes assigning the ith workload group 502(i) to the jth storage server 501(j), and sorting all the storage servers in decreasing order by the available capacity resources 504 on the storage server 501. However, operation 711 of method 900 includes only assigning the ith workload group 502(i) to the jth storage server 501(j), and does not include sorting all the storage servers in decreasing order by the available capacity resources 504.

In one embodiment, method 900 is Method D. Alternatively, Method D may include other bin packing algorithms known by those of ordinary skill in the art.

Figure 9A:
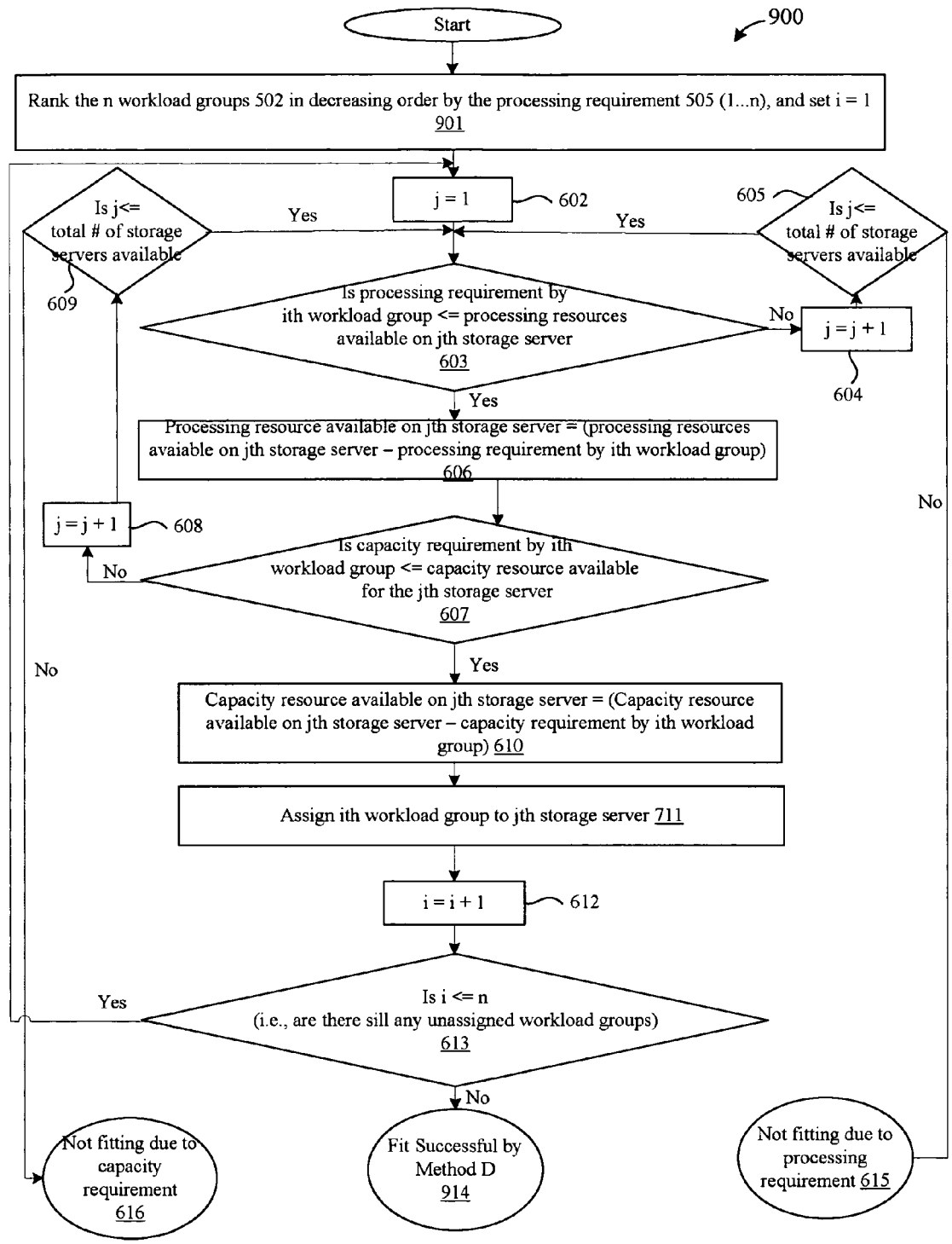
FIG. 9A is a flow chart of another embodiment of a method for bin packing.
Figure 9B:
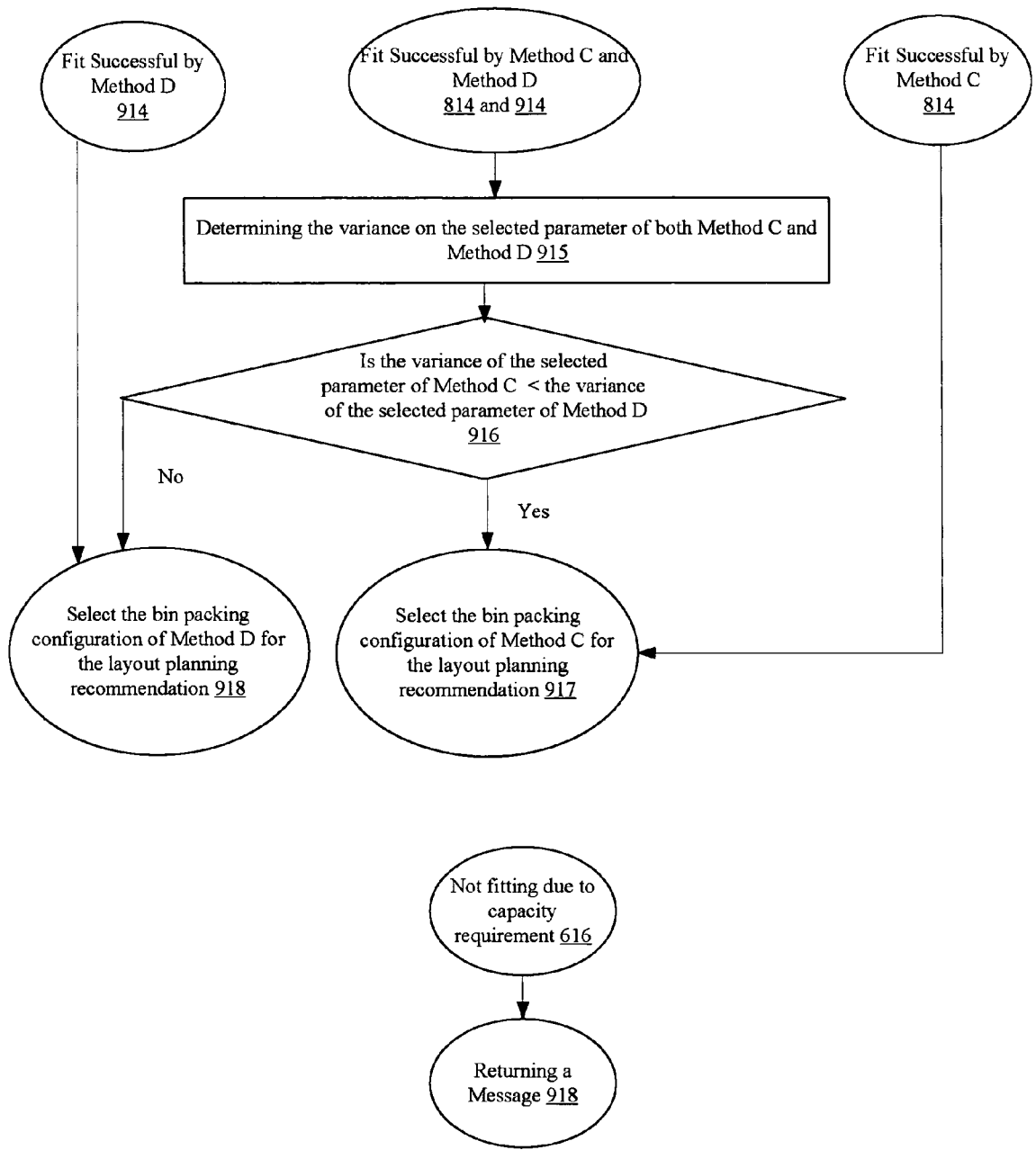
FIG. 9B is a flow chart of one embodiment of a method for load balancing based on methods of bin packing of FIGS. 8 and 9A.

FIG. 9B is a flow chart of one embodiment of a method for load balancing based on methods of bin packing of FIGS. 8 and 9A. If Method C and Method D are both successful in bin packing (e.g., all the workload groups 502(1)-502(n) fit completely, both with respect to the processing requirement 505 and the capacity requirement 506, on the storage servers 501) in operations 814 and 914 of FIGS. 8 and 9A, the method may include determining the variance of one of the selected parameters for both Method C and Method D, operation 915, and determining if the variance of one of the selected parameters (e.g., available capacity resources on each storage server 501) of Method C is less than the variance on the selected parameter of Method D, operation 916. If the variance of Method C is less than the variance of Method D, then the method may select the bin packing configuration of Method C to be used for the layout planning recommendation that is returned to the user, operation 917. Otherwise, the method may select the bin packing configuration of Method D to be used for the layout planning recommendation that is returned to the user, operation 918.

However, if only Method C was successful in bin packing in operation 814, the method may include selecting the bin packing configuration of Method C to be used for the layout planning recommendation that is returned to the user, operation 917. Similarly, if only Method D was successful in bin packing in operation 914, the method may include selecting the bin packing configuration of Method D to be used for the layout planning recommendation that is returned to the user, operation 918.

If either Method A or Method B was unsuccessful in operation 616, the method may include returning a message to the user suggesting to splitting the plurality of workload groups 502(1)-502(n) into additional workload groups, operation 918.

FIG. 10 illustrates an embodiment of one layout planning recommendation of a set of available physical resources. The layout planning recommendation 1000 includes one layout suggestion 1001, which includes mappings of workload groups onto the available physical resources on one cluster, cluster 1002, which includes two storage servers, storage server A and storage server B. In this layout planning recommendation only one cluster has been suggested, however, alternatively, additional clusters may be suggested. The layout suggestion 1001 includes the detailed layouts 1003 and 1004 on cluster 1 for storage server head A, and for storage server B, respectively. Both detailed layouts 1003 and 1004 include the number of user-specified aggregates 1005, what the aggregates include 1006, the total number of disks for aggregates 1007, for example, including the number of data disks and the number of parity disks, and the parameter used to determine how many disks are needed for the layout suggestion 1008, such as the processing requirement 505 (e.g., based on throughput), the capacity requirement 506, or the like. In addition, the detailed layouts may include additional information, such as the processing headroom on the system (e.g., 91%), total number of disks needed for the particular storage server (e.g., 18), the total number of shelves needed for this storage server (e.g., 2), or the like.

In one embodiment, the layout planning recommendation 1000 includes a comments and/or warnings 1009 to communicate additional information to the user (e.g., "Warning 1"). For example, the warnings and/or messages can be referred to in the detailed layouts 1003 and/or 1004, as seen in the total number of disks for the aggregate 1007 of FIG. 10 (e.g., "See Warning 1"). In one embodiment, the warning may include the following information: "The number of disks recommended in the layout phase has gone down from the initial estimate. While doing the initial estimate, the sizer assumes that all workload groups map to a single aggregate, and hence assumes a single large working set size for all the Exchange Servers, which can be conservative. During the layout planning phase, the working set gets broken down to multiple smaller working sets, per Exchange Server and Storage Group and hence the reduced memory pressure causes the disk count to go down. Please note that any changes to the layout assumptions (e.g., changes to input aggregate mappings or changes to User Profile mappings to Exchange Servers) can increase the number of disks needed." Alternatively, other information may be included in the comments and warnings 1009, such as "Your layout planning has resulted in some aggregates having less than 8 disks. It might be better to re-do the layout planning by clubbing such aggregates together to get lesser number of total aggregates and to minimize parity disks overhead," or the like. In another embodiment, the layout planning recommendation does not include a comments and/or warnings 1009.

In another embodiment, the layout planning recommendation 1000 includes a summary section 1010. The summary section 1010 may include the platform name (e.g., NetApp Storage Cluster Type A), the storage server version that is being used (e.g., NetApp Exchange Storage Server, Version X.X.X), the drive type that is recommended (e.g., 'X' GB and 'Y' RPM), the RAID type that is recommended (e.g., a RAID double parity RAID-DP™), and/or the RAID group size (e.g. # in group). Alternatively, additional information may be provided in the summary section 1010.

In one embodiment, the layout planning recommendation is generated and output to a user (or alternatively, the calling application) in text format, as illustrated in FIG. 10. Alternatively, the layout planning recommendation may be output to the user (or alternatively, the calling application) other formats, such as graphical, binary, or the like, or any combination thereof.

In one embodiment, the layout planning recommendation is alterable by the user. Alternatively, the layout planning recommendation may be read-only. In one embodiment, as described above, the layout planning recommendation is based on the variance of one of the selected parameters (e.g., available processing resources on each of the storage servers). In another embodiment, the layout planning recommendation module returns two or more layout options, allowing the user to select which option to deploy. In another embodiment, the layout planning module returns the two or more layout options, and indicates which layout option is recommended based on the variance.

In another embodiment, the layout planning module returns the layout options for the selected parameter (e.g., available processing resources on each of the storage servers), and the layout options according to a second parameter (e.g., available capacity resources on each of the storage servers). Alternatively, the layout planning module may return the layout options in other configurations, such as outputting the layout options that include a weighted value, allowing the user to select the layout option according to the weighting system. The weighting system may be configured by the user, or alternatively, may be preprogrammed in the layout planning recommendation module.

In one embodiment, the layout planning recommendations may be stored. A history of stored layout planning recommendations may be stored in a memory, for example, using a log file. The memory may be part in a storage disk of the data storage system, or alternatively, of the computer that executes the application program or the computer that executes the layout planning recommendation routines. For example, for each sizing request with a particular set of input requirements, the layout planning recommendation module may return a unique sizing identification (ID) (e.g., combination of customer name and a monotonically increasing number) with one or more layout options. Each layout option may include a unique serial number. The layout planning recommendations may be obtained for each of these configurations and stored into and retrieved for later use from a table that used a unique combination of sizing ID and configuration serial number. Multiple layout recommendations for the same configuration may also be stored by assigning a layout serial number to the multiple layout planning recommendations. These stored configurations may also be stored along with the table, allowing the stored configurations to be stored and retrieved for later use. Alternatively, the layout planning recommendations may be stored and retrieved based on any combination of sizing ID, configuration number, or layout serial number, or the like.

Figure 11:
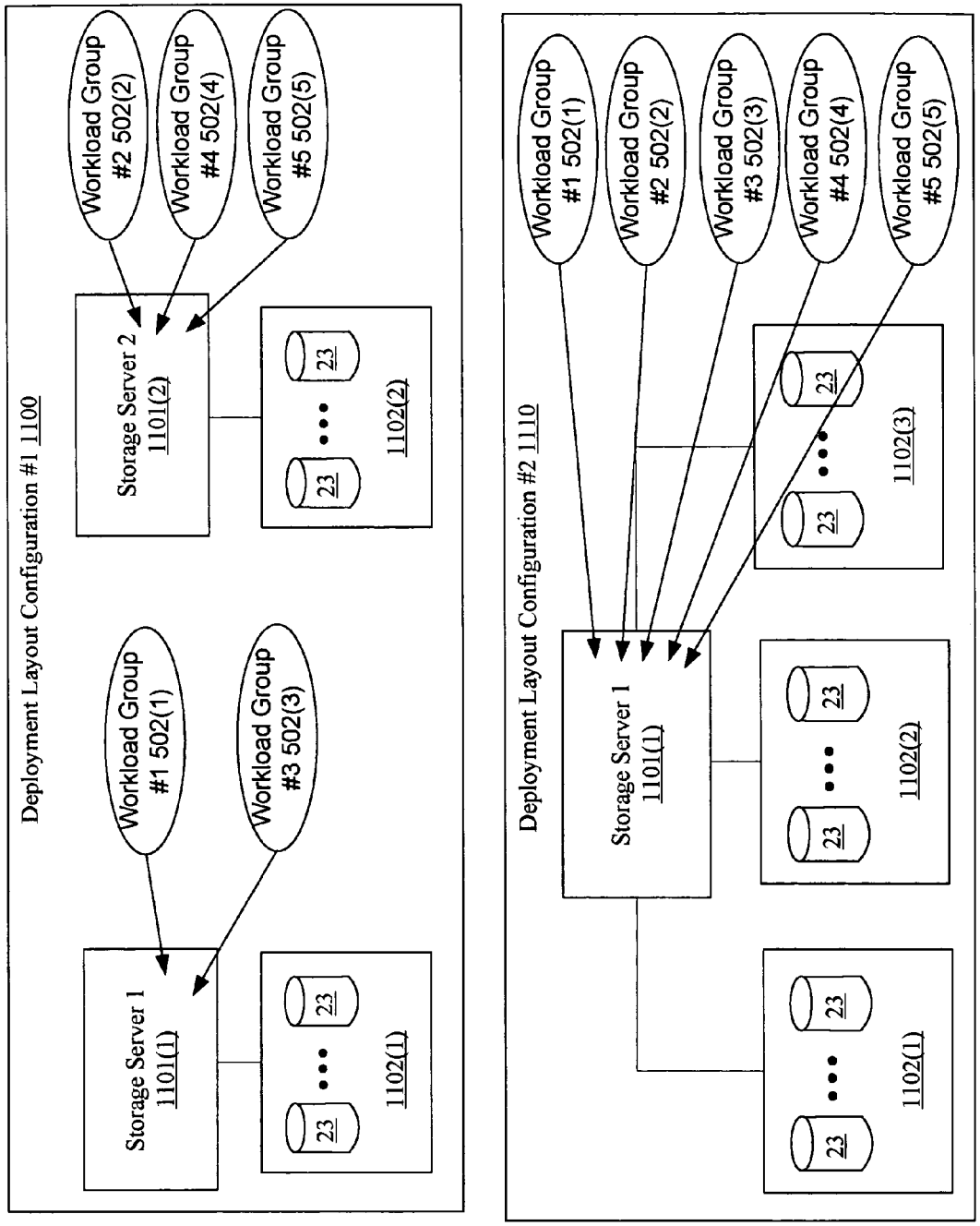
FIG. 11 illustrates two embodiments of two deployment layout configurations of the mappings of workload groups onto the set of available physical resources according to two layout planning recommendations.

FIG. 11 illustrates two embodiments of two deployment layout configurations of the mappings of workload groups onto the set of available physical resources according to two layout planning recommendations. The first deployment layout configuration 1100 includes two storage servers 1101(1) and 1101(2), two disk shelves 1102(1)-1102(2). Each shelf contains multiple disk drives 23 operated under control of the storage server 1101 according to RAID protocol. The second deployment layout configuration 1110 includes a single storage server 1101(1) and three disk shelves 1102(1)-1102(3). Each shelf contains multiple disk drives 23 operated under control of the storage server 1101 according to RAID protocol. The storage servers 1101(1) and 1101(2) of 1100 and the storage server 1101(1) of 1110 are configured to provide a number of clients 24 with access to shared files stored in the disk drives 23.

The two embodiments of FIG. 11 both include 5 workload groups, workload groups 502(1)-502(5). The workload groups may be, for example, logs, databases, volumes, files, aggregates, or any combination thereof. Each workload group includes a processing requirement 505 and a processing requirement 506.

The first deployment layout configuration 1100 includes two storage servers (e.g., mid-range storage servers) that satisfy the processing and capacity requirements of the workload groups 502(1)-502(5). In this deployment layout configuration, the layout planning recommendation maps the first and third workload groups 502(1) and 502(3) to the first storage server 1101(1), and the second, fourth, and fifth workload groups 502(2), 502(4), and 502(5) to the second storage server 1101(2). This mapping, according to the layout planning recommendation, ensures load balancing between the two storage servers.

The second deployment layout configuration 1110 includes only one storage server (e.g., high-range server) that satisfies the processing and capacity requirements 505 and 506 of the workload groups 502(1)-502(5). In this deployment layout configuration, the layout planning recommendation maps all five workload groups 502(1)-502(5) to the first storage server 1101(1).

In another embodiment, the deployment layout configuration includes three or more storage servers that satisfy the processing and capacity requirements of one or more workload groups, upon which the layout planning recommendation maps the one or more workload groups to the three or more storage servers, ensuring load balancing between the three or more storage servers.

It should be noted that deployment layout configurations of FIG. 11 show a simple network configuration characterized by a single loop with two or three shelves 1102 in each; however, other network configurations are possible. For example, there can be a greater or smaller number of shelves 1102 in the loop; there can be more than one loop attached to the storage servers 1101; or, there can even be one loop for every shelf 1102. It should also be noted that additional storage servers may be the used in the deployment layout configuration when the layout planning recommendation specifies that additional storage servers are to be used.

In one embodiment, the deployment layout configuration 1100 of FIG. 11 represents a deployment of the available physical resources according to the layout planning recommendation 1000 of FIG. 10 that is generated and output to the user. Alternatively, the layout planning recommendation 1100 may represent a deployment of the available physical resources according to other layout planning recommendations.

The embodiments described herein may allow a user to deploy various storage solutions in a more optimal fashion by receiving a layout planning recommendation for the given input parameters of workflow groups and the available physical resources. It should be noted that the available physical resources may be determined by the sizing infrastructure module, which also determines the layout planning recommendation. Alternatively, the available physical resources may be determined by the user. The embodiments described herein may also provide, in addition to the how many storage servers and storage devices needed for a particular solution, a layout planning recommendation that suggests how to deploy the storage servers and storage devices for the particular solution. Embodiments described herein may also enable users to have planning solutions that include a solution of the number of physical resources and a layout planning recommendation with proper load balancing. This may reduce escalations and bad configurations in the implementation of the solutions.

The embodiments described herein may be used in currently available sizers to give layout planning recommendations, such as NetApp Database Sizer, NetApp CustomApps Sizer, NetApp SAP sizer, NetApp Exchange Sizer, NetApp Sizer RFEs, available from Network Appliance, Inc., of Sunnyvale, Calif., Disk Magic tool, available from Intellimagic, Inc. of Leiden, Netherlands, or the like. The embodiments described herein may also be used to build more intelligent capacity planning tools.

The embodiments described herein include receiving inputs from a user regarding the workload groups to determine the physical resources needed for the workload groups and the layout planning recommendation for deployment of the physical resources to support the workload group. However, it should be noted that the inputs may be automated without user interaction. For example, the embodiments described herein may be implemented within a data storage system, and may be configured to monitor usage of the physical resources in a particular layout configuration. Based on the monitoring a new layout configuration may be recommended. It should be noted that a user may reconfigure the layout to conform to the new layout configuration as recommended. Alternatively, the new layout configuration may be automatically reconfigured without user interaction. For example, when a layout is not optimal, data could be transparently migrated from one storage server to another without user intervention, such as, for example, a log space for a storage group (e.g., Log Space for Storage Group 1 in Server 1 of the Storage Server A of FIG. 10) for an Exchange Server can be migrated transparently to another storage server within the same cluster (e.g., Storage Server B of FIG. 10).

Embodiments of the present invention include various operations, as described above. These operations may be performed by hardware components, software, firmware, or a combination thereof. The various operations may be performed by executing one or more computer programs to perform functions of the embodiments by operating on input data and generating output data. The various operations may also be implemented in, for example, special purpose logic circuitry, e.g., FPGA, ASIC, PLD, or the like). As used herein, the term "coupled to" may mean coupled directly or indirectly through one or more intervening components. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as one or more computer program products. The one or more computer programs may be tangibly embodied in an information carrier, e.g., in a machine-readable storage device or in a propagated signal, for execution by, or to control the operation of, one or more general-purpose or special-purpose processors to perform the described operations. A machine-readable medium includes any mechanism for storing or transmitting information in a form (e.g., software, processing application) readable by a machine (e.g., a computer). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network. The machine-readable medium may include, but is not limited to, magnetic storage medium (e.g., floppy diskette); optical storage medium (e.g., CD-ROM disks); digital video disk (DVD) ROM disks, magneto-optical storage medium; read-only memory (ROM); random-access memory (RAM); erasable programmable memory (e.g., EPROM and EEPROM); flash memory; electrical, optical, acoustical, or other form of propagated signal (e.g., carrier waves, infrared signals, digital signals, etc.); or another type of medium suitable for storing electronic instructions.

Additionally, some embodiments may be practiced in distributed computing environments where the machine-readable medium is stored on and/or executed by more than one computer system. In addition, the information transferred between computer systems may either be pulled or pushed across the communication medium connecting the computer systems.

The digital processing device(s) described herein may include one or more general-purpose processing devices such as a microprocessor or central processing unit, a controller, or the like. Alternatively, the digital processing device may include one or more special-purpose processing devices such as a digital signal processor (DSP), an application specific integrated circuit (ASIC), a field programmable gate array (FPGA), or the like. In an alternative embodiment, for example, the digital processing device may be a network processor having multiple processors including a core unit and multiple microengines. Additionally, the digital processing device may include any combination of general-purpose processing device(s) and special-purpose processing device(s).

Although the operations of the method(s) herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

Generally, a digital processing device receives instructions and data from a read-only memory or a random access memory or both. The essential elements of a computer are a digital processing device for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. The digital processing device and the memory can be supplemented by, or incorporated in, special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer.

The invention can be implemented in a computing system that includes a back-end component, e.g., a data server, or that includes a middleware component, e.g., an application server, or that includes a front-end component, e.g., a client computer having a graphical user interface or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A method for layout planning of a data storage system, comprising:
    receiving information indicative of a set of available physical resources of a data storage system and a plurality of workload groups;
    based on the information, automatically load balancing the plurality of workload groups to the set of available physical resources of the data storage system; and
    generating a layout planning recommendation of the set of available physical resources that supports the plurality of workload groups based on the load balancing, wherein the load balancing further comprises:
        performing a first packing algorithm using one or more parameters;
        performing a second packing algorithm using the one or more parameters; and
        determining which packing algorithm includes a least variance on a selected parameter of the one or more parameters to generate the layout planning recommendation.

2. The method of claim 1, wherein load balancing comprises mapping the plurality of workload groups to the set of available physical resources through heuristics.

3. The method of claim 2, wherein a first parameter of the one or more parameters is the available processing resources on each storage server after mapping, and a second parameter of the one or more parameters is the available capacity resources of one or more storage devices corresponding to each storage server after mapping, and wherein each workload group comprises a processing requirement and a capacity requirement.

4. The method of claim 2, wherein the first packing algorithm comprises a Worst-Fit bin packing algorithm, and the second packing algorithm comprises a First-Fit bin packing algorithm.

5. The method of claim 2, wherein generating the layout planning recommendation further comprises determining a number of storage servers and a number of storage devices to be coupled to each of the storage servers to support the plurality of workload groups.

6. The method of claim 2, wherein generating the layout planning recommendation further comprises determining one or more of the following: a number of storage servers, a number of storage volumes, a number of databases, a number of logs, and a number of storage devices to be coupled to each of the storage servers to support the plurality of workload groups.

7. The method of claim 6, wherein generating the layout planning recommendation further comprises determining types of each of the storage servers and storage devices.

8. The method of claim 1, further comprising outputting the layout planning recommendation to a user.

9. The method of claim 8, wherein receiving information comprises receiving the information from a calling application program, and wherein outputting the layout planning recommendation comprises outputting the layout planning recommendation to the calling application program.

10. The method of claim 9, wherein receiving the information indicative of the set of available physical resources and the plurality of workload groups comprises:
   receiving the information indicative of set of available physical resources from either from a sizing tool of a sizing infrastructure module or the calling application program; and
   receiving the plurality of workload groups from either the calling application program or the sizing tool of the sizing infrastructure module.

11. The method of claim 10, wherein the sizing infrastructure module and the calling application program each execute on a respective computer, and wherein communication between the respective computers takes place over a network.

12. The method of claim 11, wherein receiving from the calling application program comprises receiving the requirements through an XML remote procedure call over an HTTP connection.

13. A method for layout planning of a data storage system, comprising:
   receiving information indicative of a set of available physical resources of a data storage system and a plurality of workload groups;
   based on the information, automatically load balancing the plurality of workload groups to the set of available physical resources of the data storage system, wherein the available physical resources comprise one or more storage devices, and one or more storage server, wherein the load balancing further comprises:
      performing a first packing algorithm using one or more parameters; and
      performing a second packing algorithm using the one or more parameters, wherein performing the first packing algorithm comprises:
         selecting a workload group of the plurality of workload groups; and
         mapping the workload group to a storage server of the one or more storage servers that has a maximum amount of available processing resource and that can support the capacity requirement of the selected workload group, and wherein performing the second packing algorithm comprises:
            mapping one or more workload groups to a first storage server of the one or more storage servers until the first storage server either does not have enough available processing resources to support the processing requirement of a current workload group or cannot support the capacity requirement of the current workload group; and
            mapping one or more workload groups to a second storage server when the first storage server does not have enough available processing resources to support the processing requirement of the current workload group or cannot support the capacity requirement of the current workload group; and
   generating a layout planning recommendation of the set of available physical resources that supports the plurality of workload groups, wherein generating the layout planning recommendation comprises determining which packing algorithm includes a least variance on a selected parameter of the one or more parameters.

14. The method of claim 13, wherein determining which packing algorithm includes the least variance comprises:
   determining whether both the first and second packing algorithms were successful in assigning the plurality of workload groups to the one or more storage servers; and
   in response to determining that both the first and second packing algorithms were successful, selecting a layout planning recommendation from either the first or second packing algorithm based on the packing algorithm that includes the least variance on the selected parameter of the one or more parameters.

15. The method of claim 14, further comprising:
   in response to determining that only one of the first and second packing algorithms were successful, selecting a layout planning recommendation from the one packing algorithm that was successful; and
   in response to determining that none of the first and second packing algorithms were successful, returning a message to suggest splitting the plurality of workload groups into additional workload groups.

16. The method of claim 15, wherein determining which packing algorithm includes the least variance further comprises:
   in response to determining that none of the first and second packing algorithms were successful, determining whether one of the first and second packing algorithms was unsuccessful due to a storage server not being able to support the capacity requirement of the selected workload group;
   in response to determining that one of the packing algorithms was unsuccessful, performing a third packing algorithm and a fourth packing algorithm, wherein the third packing algorithm comprises:
      selecting a workload group of the plurality of workload groups; and
      mapping the workload group to a storage server that can support the capacity requirement and the processing requirement of the selected workload group; and
      wherein the fourth packing algorithm comprises:
         mapping one or more workload groups to a first storage server until the first storage server cannot support the capacity requirement of another workload group; and
         mapping one or more workload groups to a second storage server when the first storage server cannot support the capacity requirement of another workload group;
   in response to determining that both the third and fourth packing algorithms were successful, selecting a layout planning recommendation from either the third or fourth packing algorithm based on the packing algorithm that includes the least variance on the selected parameter of the one or more parameters;
   in response to determining that only one of third and fourth packing algorithms were successful, selecting a layout planning recommendation from the one packing algorithm that was successful; and
   in response to determining that none of the third and fourth packing algorithms were successful, returning a message to suggest splitting the plurality of workload groups into additional workload groups.

17. The method of claim 15, wherein the selected layout is based on the least variance of the first parameter, which is based on a least variance of available processing resources on each storage server after the mapping.

18. A sizing tool for a data storage system, comprising:
   a layout planning recommendation module configured to receive information indicative of a set of available physical resources and a plurality of workload groups from a configuration estimation module, and to automatically load balance the plurality of workload groups to the set of available physical resources based on the information, wherein the layout planning recommendation module is configured to automatically load balance by:
  performing a first packing algorithm using one or more parameters;
  performing a second packing algorithm using the one or more parameters; and
  determining which packing algorithm includes a least variance on a selected parameter of the one or more parameters to generate the layout planning recommendation.

19. The sizing tool of claim 18, wherein the layout planning recommendation module is configured to output a layout planning recommendation to a user based on the load balancing.

20. The sizing tool of claim 19, wherein the sizing tool is coupled a user interface, wherein the user interface is configured to receive the layout planning recommendation from the layout planning recommendation module and to display the layout planning recommendation on a display.

21. The sizing tool of claim 20, wherein the user interface is configured to receive the information indicative of the plurality of workload groups from a user and to send the information to the layout planning recommendation module.

22. The sizing tool of claim 20, wherein the user interface is configured to allow a user to alter the layout planning recommendation.

23. The sizing tool of claim 20, wherein the user interface is configured to store the layout planning recommendation in memory.

24. The sizing tool of claim 18, wherein the plurality of workload groups each comprise storage resource requirements.

25. The sizing tool of claim 24, wherein the storage resource requirements comprises a processing resource requirement and a capacity resource requirement.

26. The sizing tool of claim 18, wherein the available physical resources comprise one or more storage devices, and one or more storage servers.

27. The sizing tool of claim 18, further comprising the configuration estimation module coupled to the layout planning recommendation module, wherein the configuration estimation module is configured to receive calls from one or more applications, and wherein the configuration estimation module is configured to receive the plurality of workload groups from an calling application program of one of the one or more applications.

28. The sizing tool of claim 27, further comprising the one or more applications coupled to the configuration estimation module.

29. The sizing tool of claim 28, wherein the one or more applications are sizing tools.

30. The sizing tool of claim 29, wherein each sizing tool is at least one of an Exchange Sizer, a Database Sizer, a Custom Application Sizer, or a Request-For-Extension Sizer.

31. A machine readable storage medium having instructions thereon, which instructions, when executed by a digital processing device, cause the digital processing device to perform the following, comprising:
  receiving information indicative of a set of available physical resources and a plurality of workload groups;
  based on the information, load balancing the plurality of workload groups to the set of available physical resources of a data storage system, wherein the load balancing is automated, wherein load balancing comprises mapping the plurality of workload groups to the set of available physical resources through heuristics using two or more packing algorithms and a least variance on one selected parameter of two or more packing parameters; and
  generating a layout planning recommendation of the set of available physical resources that supports the plurality of workload groups based on the load balancing.

32. The machine readable storage medium of claim 31, having further instructions thereon, which further instructions, when executed by the digital processing device, cause the digital processing device to perform the following, comprising outputting a layout planning recommendation to a user.

33. The machine readable storage medium of claim 32, wherein the available physical resources comprise one or more storage servers and one or more corresponding storage devices, wherein a first parameter of the two or more packing parameters is the available processing resources on each storage server after mapping, and a second parameter of the two or more packing parameters is the available capacity resources of one or more storage devices corresponding to each storage server after mapping, and wherein each workload group comprises a processing requirement and a capacity requirement.

34. The machine readable storage medium of claim 31, wherein performing the first packing algorithm comprises:
  selecting a workload group of the plurality of workload groups; and
  mapping the workload group to a storage server of the one or more storage servers that has a maximum amount of available processing resource and that can support the capacity requirement of the selected workload group, and wherein performing the second packing algorithm comprises:
  mapping one or more workload groups to a first storage server of the one or more storage servers until the first storage server either does not have enough available processing resources to support the processing requirement of a current workload group or cannot support the capacity requirement of the current workload group; and
  mapping one or more workload groups to a second storage server when the first storage server does not have enough available processing resources to support the processing requirement of the current workload group or cannot support the capacity requirement of the current workload group.

* * * * *